United States Patent
Nishikawa

(10) Patent No.: US 7,050,189 B2
(45) Date of Patent: May 23, 2006

(54) NETWORK PRINT SYSTEM INCLUDING MEMORY SERVER AND PRINTER

(75) Inventor: Shinichi Nishikawa, Fukuoka (JP)

(73) Assignee: Matsushita Electric Industrial Co., Ltd.

(*) Notice: Subject to any disclaimer, the term of this patent is extended or adjusted under 35 U.S.C. 154(b) by 1091 days.

(21) Appl. No.: 09/814,326

(22) Filed: Mar. 22, 2001

(65) Prior Publication Data

US 2001/0051963 A1 Dec. 13, 2001

(30) Foreign Application Priority Data

Mar. 22, 2000 (JP) ........................... 2000-079764
Mar. 31, 2000 (JP) ........................... 2000-097329

(51) Int. Cl.
*G06F 13/00* (2006.01)
*G06F 3/12* (2006.01)

(52) U.S. Cl. .................. 358/1.15; 358/1.13; 358/1.14; 358/1.9

(58) Field of Classification Search ......... 358/1.1–1.18; 709/212–215, 223–224, 228–232; 710/1, 710/7, 8, 19, 31–34, 46–48
See application file for complete search history.

(56) References Cited

U.S. PATENT DOCUMENTS 6,567,180 B1 * 5/2003 Kageyama et al. ........ 358/1.15
6,836,342 B1 * 12/2004 Vidyanand ................ 358/1.18

* cited by examiner

*Primary Examiner*—Douglas Tran
(74) *Attorney, Agent, or Firm*—RatnerPrestia

(57) ABSTRACT

A network print system having a printer and a memory server connected through a communication network is capable of recovering from a printer error securely without re-transmitting data from a computer. The printer comprises an input unit for receiving print data from the communication network, an interpretation controller for converging the received print data into a file in a printer intermediate language, an expansion controller for expanding the file in the printer intermediate language into bit map data, a memory data input/output unit for exchanging data in the printer intermediate language with the memory server through the communication network, and a error detector for detecting a printer error. Simultaneously to the print output, the printer stores data in the printer intermediate language in the memory server, and reads back the data of pages which is not delivered in the case of an error.

9 Claims, 31 Drawing Sheets

FIG. 8
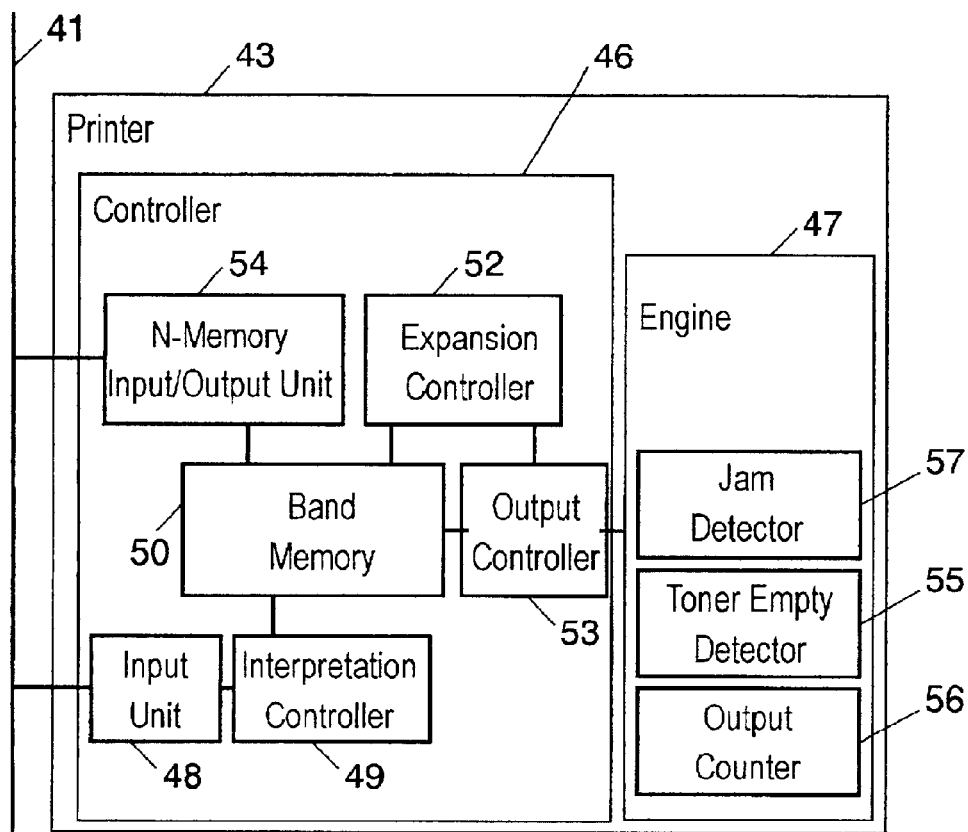
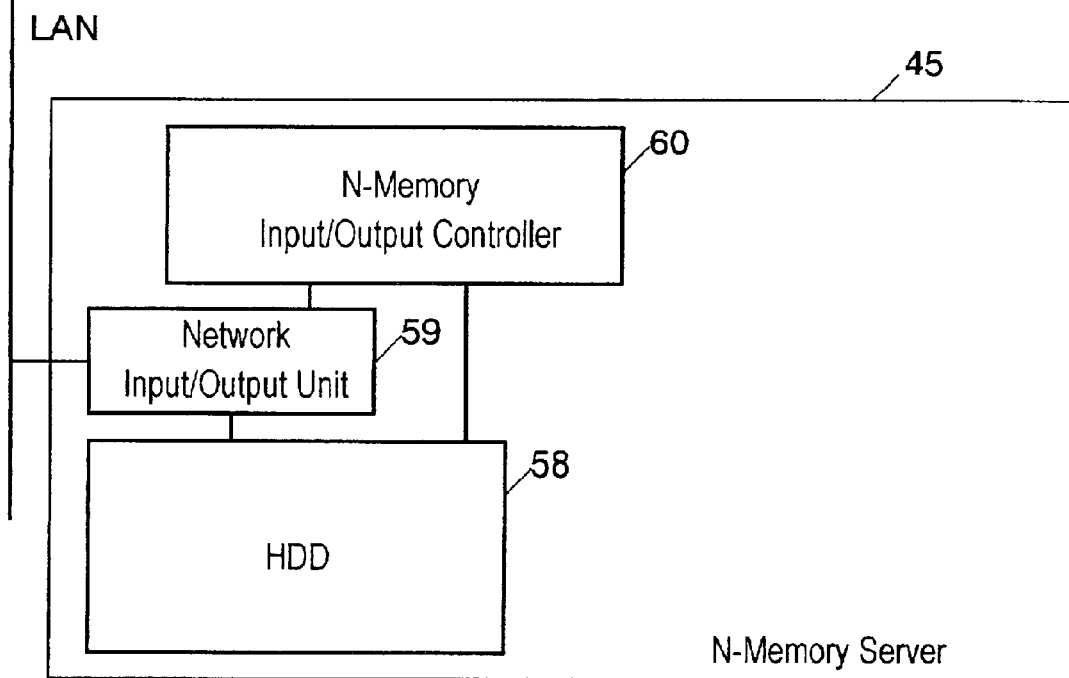

NETWORK PRINT SYSTEM INCLUDING MEMORY SERVER AND PRINTER

FIELD OF THE INVENTION

The present invention relates to a printer under communication network environments and more particularly to a network print system for utilizing print data in coordination with other machines through a communication network.

BACKGROUND OF THE INVENTION

A printer generally receives an output file of a computer such as a personal computer (PC) in a printer description language (PDL) that is understandable for the printer. The file is converted into bit map data through a printer intermediate language such as a display list (DL) by a controller in the printer and delivered to a printing engine.

In the case of an error such as jamming occurring in a printing process or an additional output after a printing, a user must start up the application of the PC again to instruct an output.

To avoid this, the printer incorporates an auxiliary storage unit such as a hard disk drive (HDD) and sequentially stores a DL file in the built-in HDD simultaneously with the output. In the case of a printer error, the printer reads the stored DL file from a next page, and recovers from the error.

This printer becomes expensive because the HDD or other storage means is incorporated. And when the user delivers the print data again into the PC, if the computer and printer are connected one by one, an output can be instructed again from the computer even in the event of a printer error. However, in a general printing in the communication network environments, the output is delivered through the server, and the user cannot recognize a printer error unless actually observing the printer. If the data is issued again in an error state of the printer, an output file may be accumulated in a spooler of the server, and this file must be deleted by a server manager.

SUMMARY OF THE INVENTION

A network print system having a printer and a memory server connected through a communication network securely recovers from an error in the printer without re-transmitting data from a computer. The printer comprises an input unit for receiving print data from a communication network, an interpretation controller for converting the received print data into that in a printer intermediate language, a expansion controller for expanding the data in the printer intermediate language into bit map data and storing in a page memory, a memory data input/output unit for exchanging the data in the printer intermediate language with a memory server through the communication network, and an error detector for detecting a print error. Simultaneously to print output, the printer accumulates the printer intermediate language in the memory server, and reads back the printer intermediate language of an undelivered page in the event of an error.

BRIEF DESCRIPTION OF THE DRAWINGS

FIG. 8 is a block diagram showing a hardware configuration of the network print system according to embodiment 2.

DESCRIPTION OF THE PREFERRED EMBODIMENTS

Exemplary Embodiment 1

Figure 1:
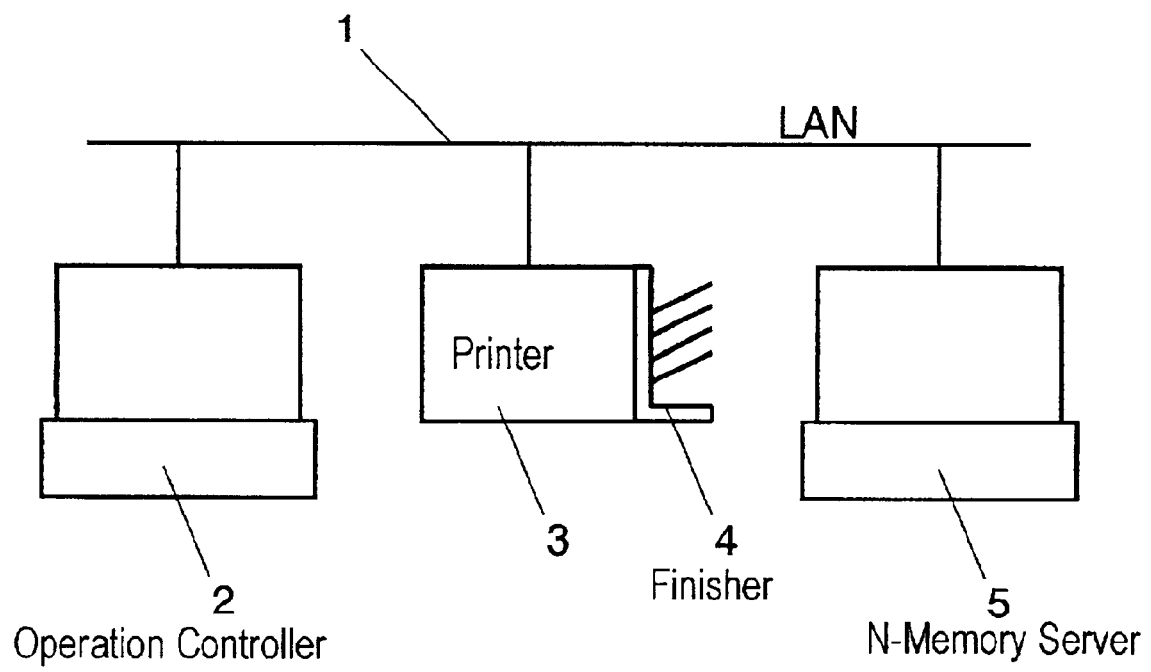
FIG. 1 shows a configuration of a network print system according to exemplary embodiment 1 of the present invention.
Figure 2:
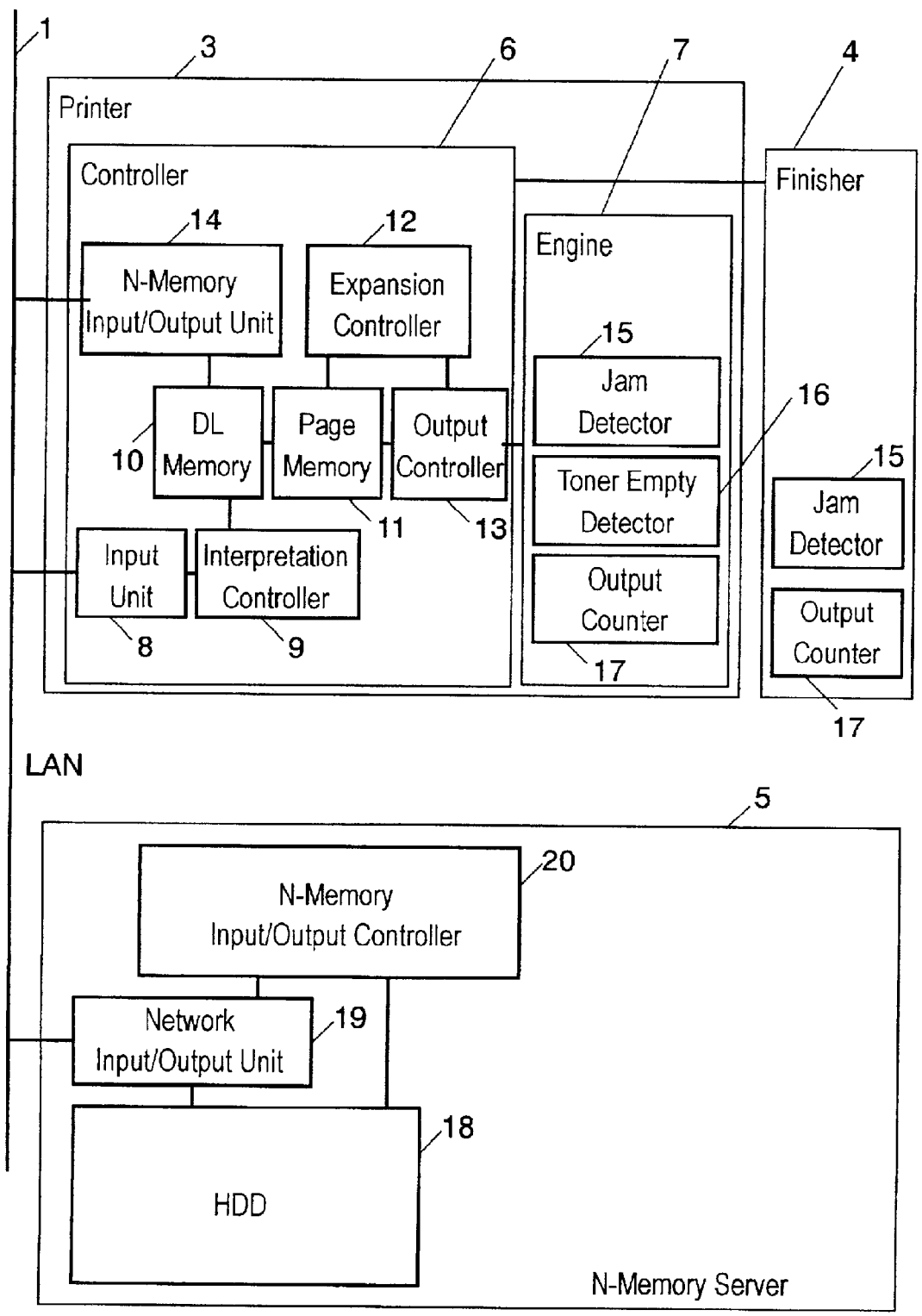
FIG. 2 is a block diagram showing a hardware configuration of the network print system according to embodiment 1.
Figure 3:
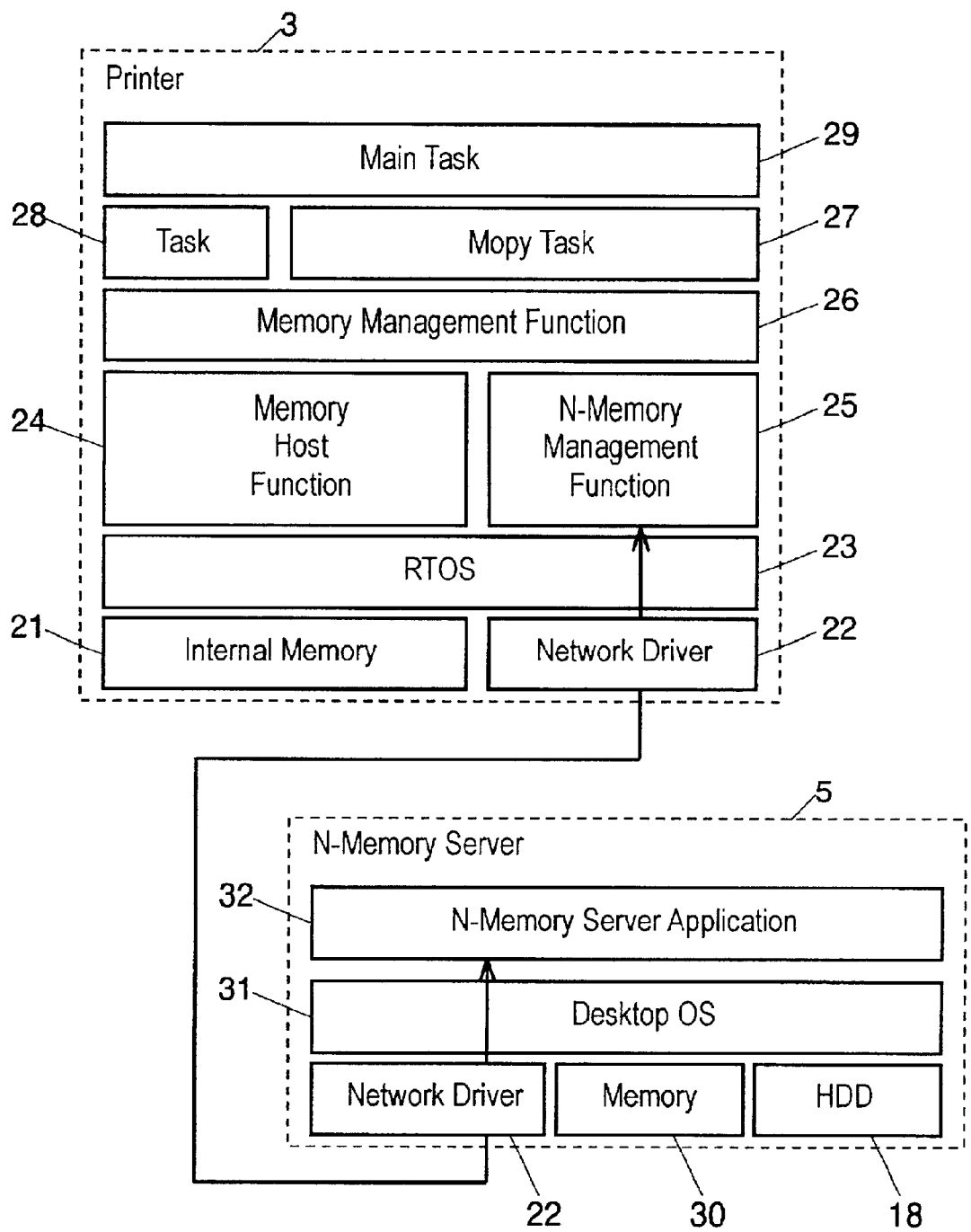
FIG. 3 is a block diagram showing a software configuration of the network print system according to embodiment 1.
Figure 4:
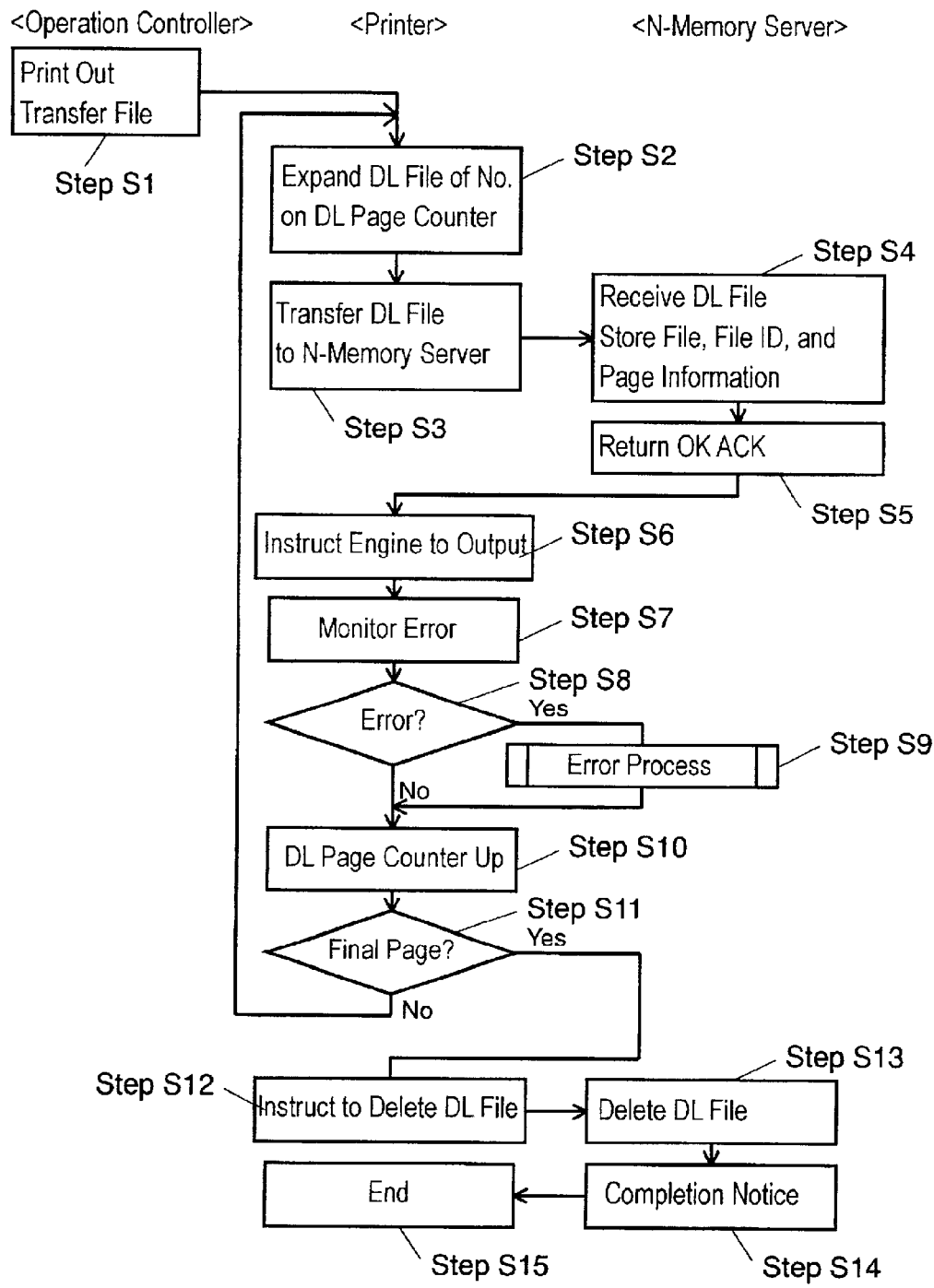
FIG. 4 is a flowchart of a normal operation of the network print system according to embodiment 1.
Figure 5:
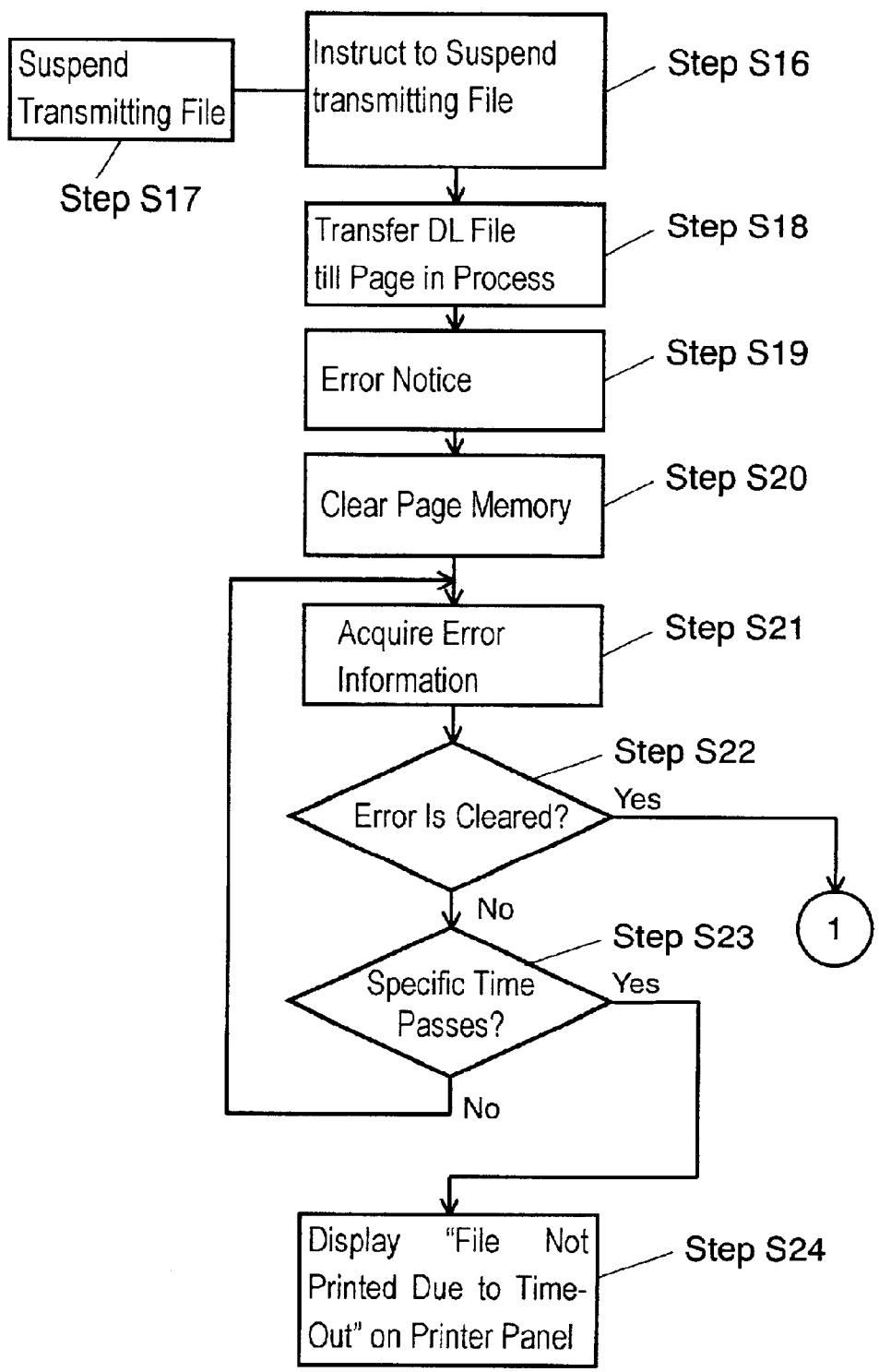
FIG. 5 is a flowchart of an operation in the case of an error of the network print system according to embodiment 1.
Figure 6:
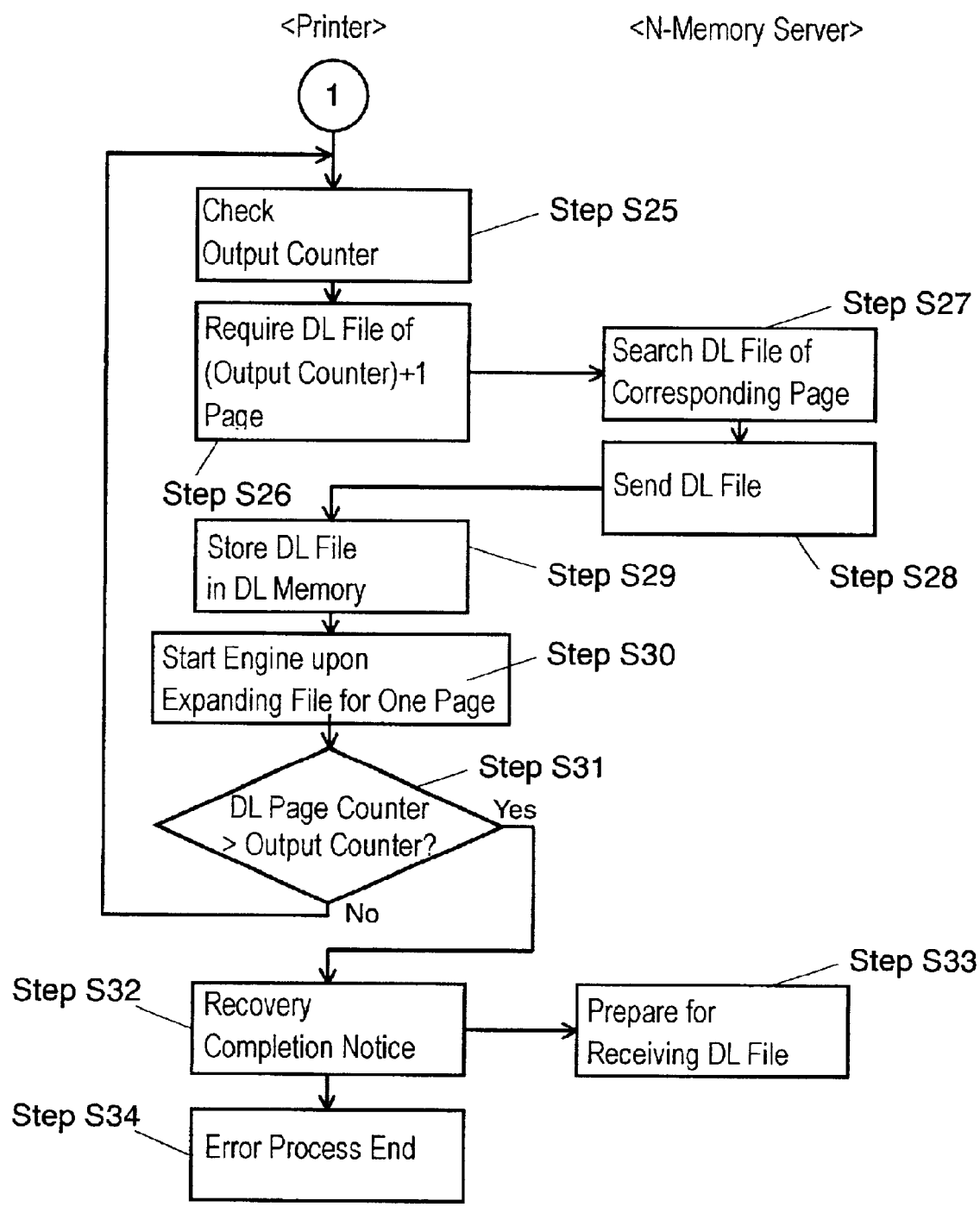
FIG. 6 is a flowchart of an operation in the case of an error of the network print system according to embodiment 1.

FIG. 1 shows a configuration of a network print system according to exemplary embodiment 1 of the present invention. FIG. 2 is a block diagram showing a hardware configuration of the system. FIG. 3 is a block diagram showing a software configuration of the system. FIG. 4 is a flowchart of normal operation of the system. FIG. 5 and FIG. 6 are flowcharts of operations in the event of an error of the system.

As shown in FIG. 1, in the network print system of the embodiment, a printer 3 and a finisher 4 are connected to a network memory (N-Memory) server 5 so as to communicate with each other through a LAN 1, a communication network. A file to be instructed to output by an application software on an operation controller 2 connected to the LAN 1 is transmitted to the printer 3 through a server (not shown). The file is then converted into a display list (DL) in a printer intermediate language in the printer 3, stored in the N-Memory server 5, and printed out.

The configurations of the printer 3, the finisher 4 and the N-Memory server 5 are shown in FIG. 2.

The printer 3 comprises a controller 6 for expanding the received data from the LAN 1 into bit map data, and an engine 7 for printing out the expanded data. The controller 6 includes an input unit 8 for receiving an output file of the operation controller 2 through the LAN 1, an interpretation controller 9 for converting the input data into a DL file, a DL memory 10 for storing the DL file, an expansion controller 12 for expanding the DL file into bit map, a page memory 11 for storing the expanded bit map data, an output controller 13 for issuing one-page data to the engine 7, and an N-Memory input/output unit 14 for exchanging the DL file with the N-Memory server 5. The engine 7 includes a jam detector 15 for detecting paper jamming in a paper-conveying route, a toner-empty detector 16 for detecting shortage of a toner, and an output counter 17 for counting the number of delivered sheets. The finisher 4 also includes a jam detector 15 for detecting paper jamming in a paper-conveying route and the output counter 17 for counting the number of delivered sheets.

The finisher 4 operates to sort the printed sheets automatically.

The N-Memory server 5 includes a network input/output unit 19 connected to the LAN 1 for exchanging DL files, a hard disk drive (HDD) 18 for storing the received DL files, and an N-Memory controller 20 for controlling reading and writing necessary DL files by managing the input and output to the HDD 18.

FIG. 3 shows a software configuration of the printer 3 and the N-Memory server 5.

The control software of the printer 3 operates on a real-time OS (RTOS) 23 and includes a main task 29 for managing various tasks on the top of the software. On the one lower step than the main task 29, the software includes a multiple original prints (Mopy) task 27 for managing a Mopy output for shortening an output time by storing the DL file in the N-Memory server 5 and reissuing this file for the second and successive outputs, and a task 28 for controlling other operations in the printer. These tasks must use commonly an internal memory 21 built in the printer 3 and an external memory using the N-Memory server 5 through the LAN 1. The controlling of the tasks is managed by a memory management function 26. On the one lower step than the memory management function 26, the software includes a memory host function 24 for handling the internal memory, and an N-Memory management function 25 for handling the external memory in the N-Memory server 5. The software further includes a network driver 22 for controlling the network.

The N-Memory server 5 is realized by a computer such as a personal computer (PC), and in this case, it operates on a desktop OS 31. An N-Memory server application 32 controls a memory 30 and the HDD 18, and exchanges DL files with the printer 3 through the network driver 22.

In the network print system having such configuration, an operation for error recovery by employing the DL file in N-Memory server 5 in the case of an error is explained by referring to FIG. 4 through FIG. 6.

A user instructs an output of data such as application data to the printer 3 through the operation controller 2, and transfers the files (step S1). As a result, the output files are sent to the printer 3 through the server (not shown). In the printer 3, the DL page counter is reset to zero, and then, the files are sequentially converted into DL files by the interpretation controller 9, and the DL file of a number on the DL page counter is expanded in the DL memory 10 (step S2). Simultaneously, the controller 9 transfers the DL file also to the N-Memory server 5 (step S3). The server 5 receives the DL file from the printer 3, and stores in the HDD 18 along with the file ID and page information (step S4). When storing the DL file, the server 5 returns an OK Acknowledgement (ACK) to the printer 3 (step S5). In the printer 3, the expansion controller 12 expands the DL file as a bit map into the page memory 11, and instructs an output of the file to the engine 7 after confirming the ACK received from the server 5 (step S6). During the output, the output controller 13 monitors an error situation in the engine 7 and the finisher 4 (step S7), and judges if an error has occurred or not (step S8). If the error occurs in the engine 7 or finisher 4, the error is processed (step S9). When the file is issued normally without an error, the DL page counter counts up by one (step S10). It is judged if the DL file is the final page or not (step S11). If it is not the final page, the process returns to step S2, and successive pages are continuously output similarly. When confirming to complete outputting the final page, the printer 3 specifies a file ID to the server 5 for instructing to delete the DL file corresponding to the ID (step S12). Thus, the server deletes the DL file is deleted on the HDD 18 (step S13), and returns a completion notice to the printer 3 (step S14). Upon confirming the notice from the server 5, the printer 3 finishes the operation (step S15).

An error processing at step S9 will specifically be explained by referring to FIG. 5 and FIG. 6. In the case of an error, the printer 3 instructs the operation controller 2 or the server transmitting the data to suspend transmitting the data after the page being processed when receiving data (step S16). Detecting this instruction, the operation controller 2 or the server suspends transmitting the file (step S17). And then, the printer 3 transfers the DL file up to the page being processed to the N-Memory server 5 (step S18), and notices occurrence of the error to the server 5 (step S19). Then, the printer 3 clears the page memory 11 for the present output (step S20), and monitors and acquires the error information from the engine 7 or finisher 4 (step S21). It is judged if the error is cleared or not thanks to, for example, that the user removes the jamming paper from the printer 3 or finisher 4 (step S22). If the error is not cleared, it is judged if a specific time passes from the occurrence of the error with a timer (step S23). If the specific time does not pass at step S23, back to step S21, the printer 3 acquires the error information again. If the specific time passes at step S23, a message telling data is not printed out due to expiration is displayed on the printer panel, and the process is over (step S24). In this case, the user eliminates the error and can instruct data output again through the operation controller 2.

When the error is cleared at step S22, the operation shifts to a flowchart in FIG. 6, and the printer 3 checks the output counter 17 in the finisher 4 (step S25). Obtaining a number (N) on the output counter, the printer 3 requests to the N-Memory server 5, transmitting the DL file on a page of a number (N+1) on the output counter for recovering an image (step S26). The server 5 searches the DL file of the corresponding page (step S27), and transmits the DL file to the printer 3 (step S28). The printer 3 stores the received DL file in the DL memory 10 (step S29). The expansion controller 12 expands the DL file into the bit map, puts it into the page memory 11, and after expanding it for one page, starts up the engine 7 for outputting the data (step S30). Then, numbers on the DL page counter and output counter are compared (step S31). When the number on the output counter is smaller, back to step S25, the server 5 continues outputting data because the printer needs to be recovered from the error. When the number on the output counter becomes equal to that on the DL page counter, a recovery-end notice is sent to the server 5 (step S32). As a result, the server 5 prepares again for receiving the DL file (step S33). Finally, the operation of the printer 3 finishes the error processing (step S34), and returns to step S10.

As described above, according to embodiment 1 of the invention, storing data simultaneously to output the data, the N-Memory server 5 sends the stored DL file again to the printer from the next page to the delivered page of the number on the output counter in the case of a printer error. And thus, the system recovers the printer from error securely without re-transmitting data from the operation controller 2.

The input unit for receiving print data from the communication network and the memory data input/output unit for exchanging data in the printer intermediate language with the memory server through the communication network may be common.

The server sending print data through the operation controller 2 to the printer 3 on the LAN 1, i.e., the print server is not shown, but is easily realized by a computer. The printer server and N-Memory server 5 may be either different computers or a common computer.

Exemplary Embodiment 2

Figure 7:
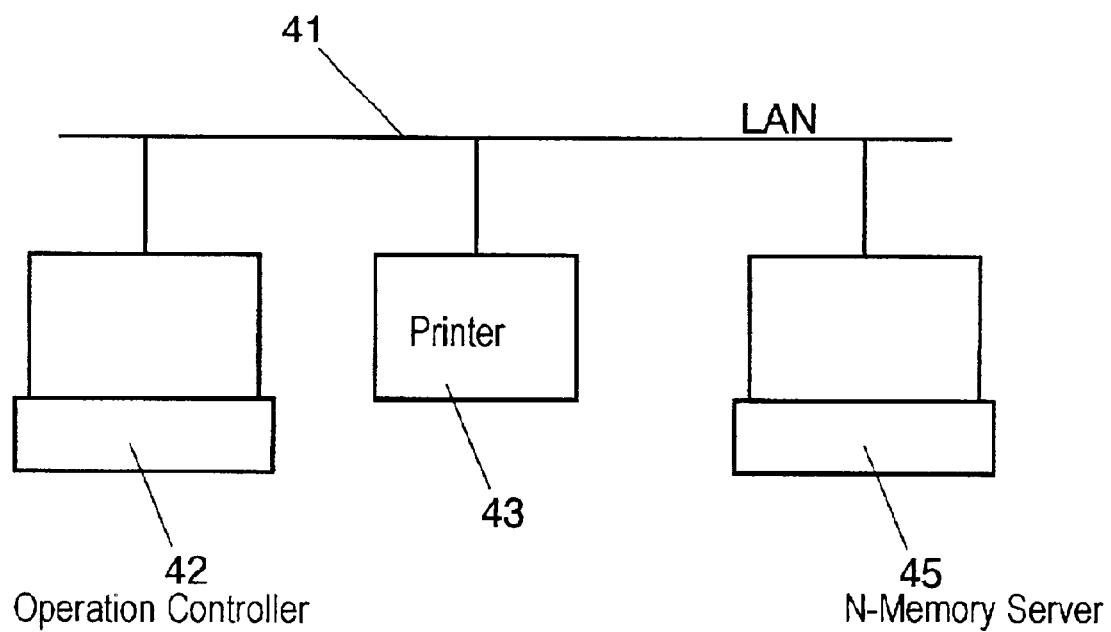
FIG. 7 shows a configuration of a network print system according to exemplary embodiment 2 of the present invention.
Figure 9:
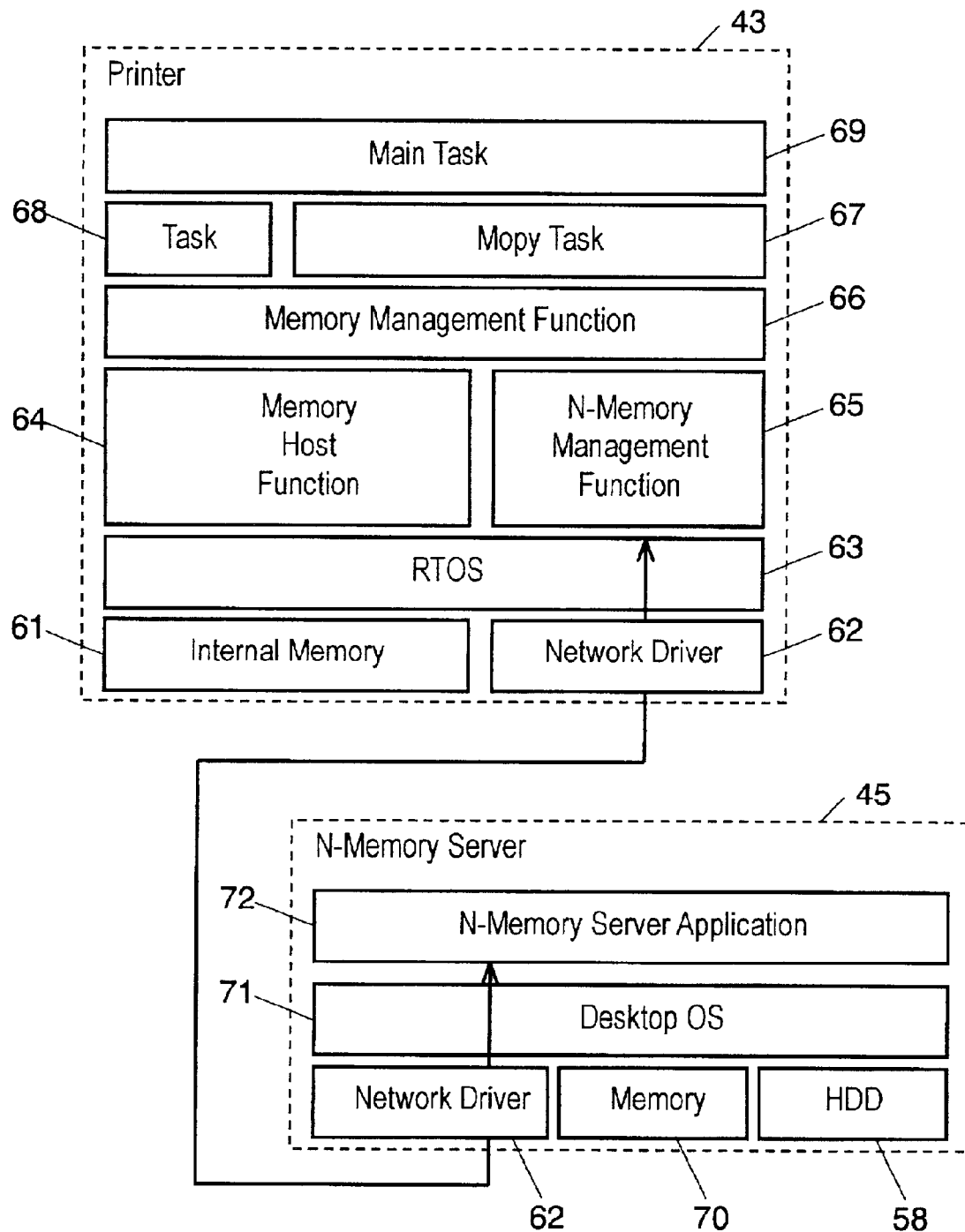
FIG. 9 is a block diagram showing a software configuration of the network print system according to embodiment 2.
Figure 10:
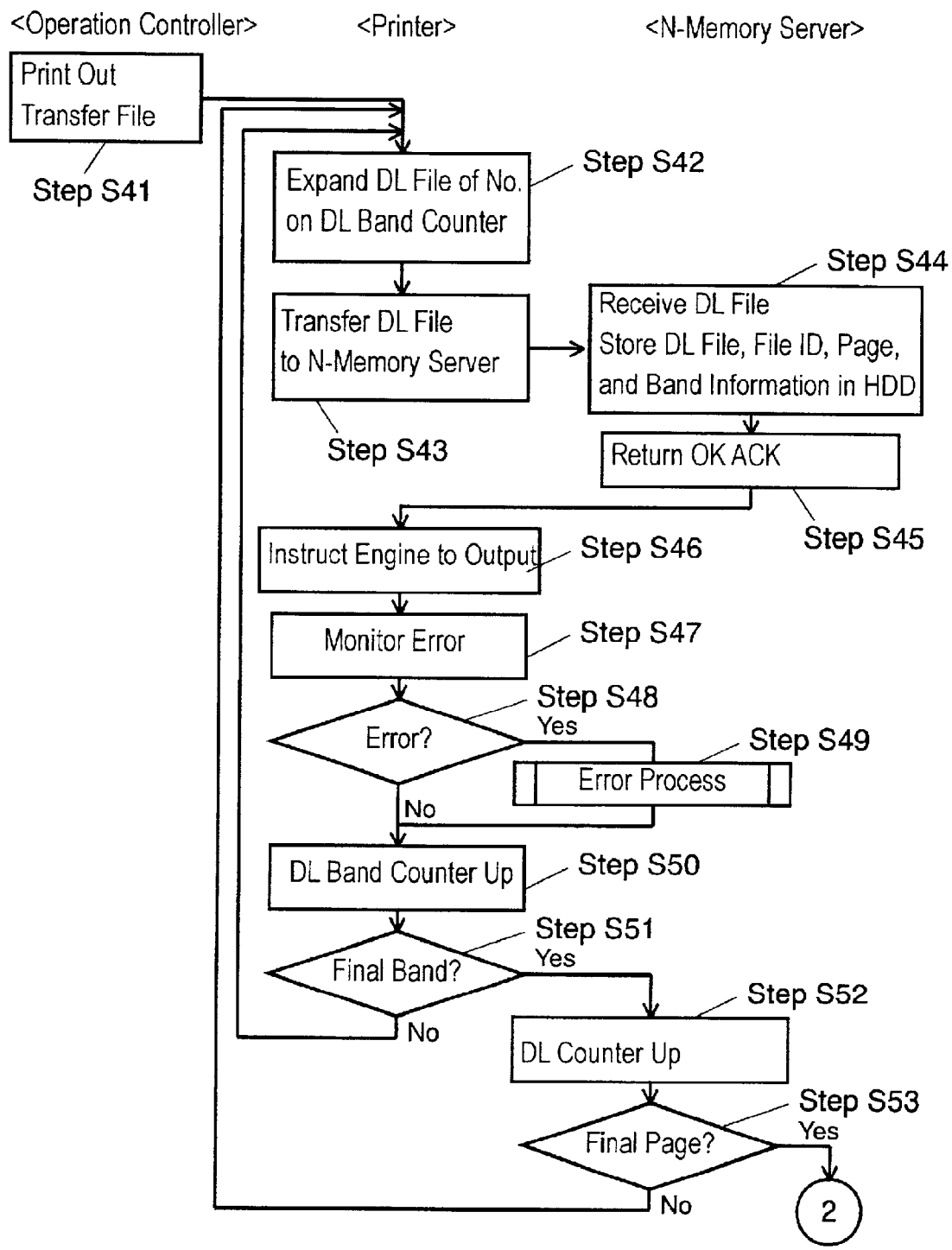
FIG. 10 is a flowchart of a normal operation of the network print system according to embodiment 2.
Figure 11:
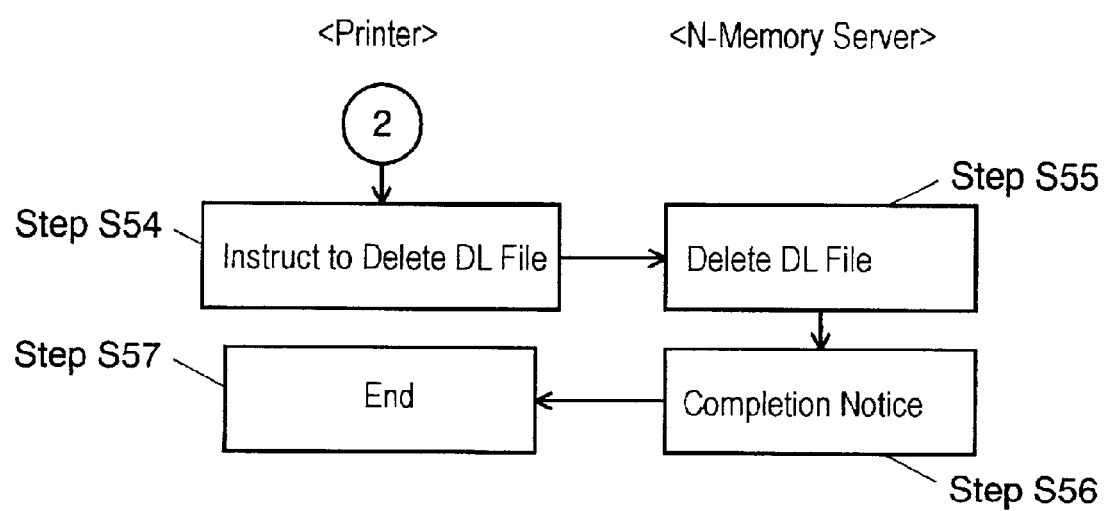
FIG. 11 is a flowchart of a normal operation of the network print system according to embodiment 2.
Figure 12:
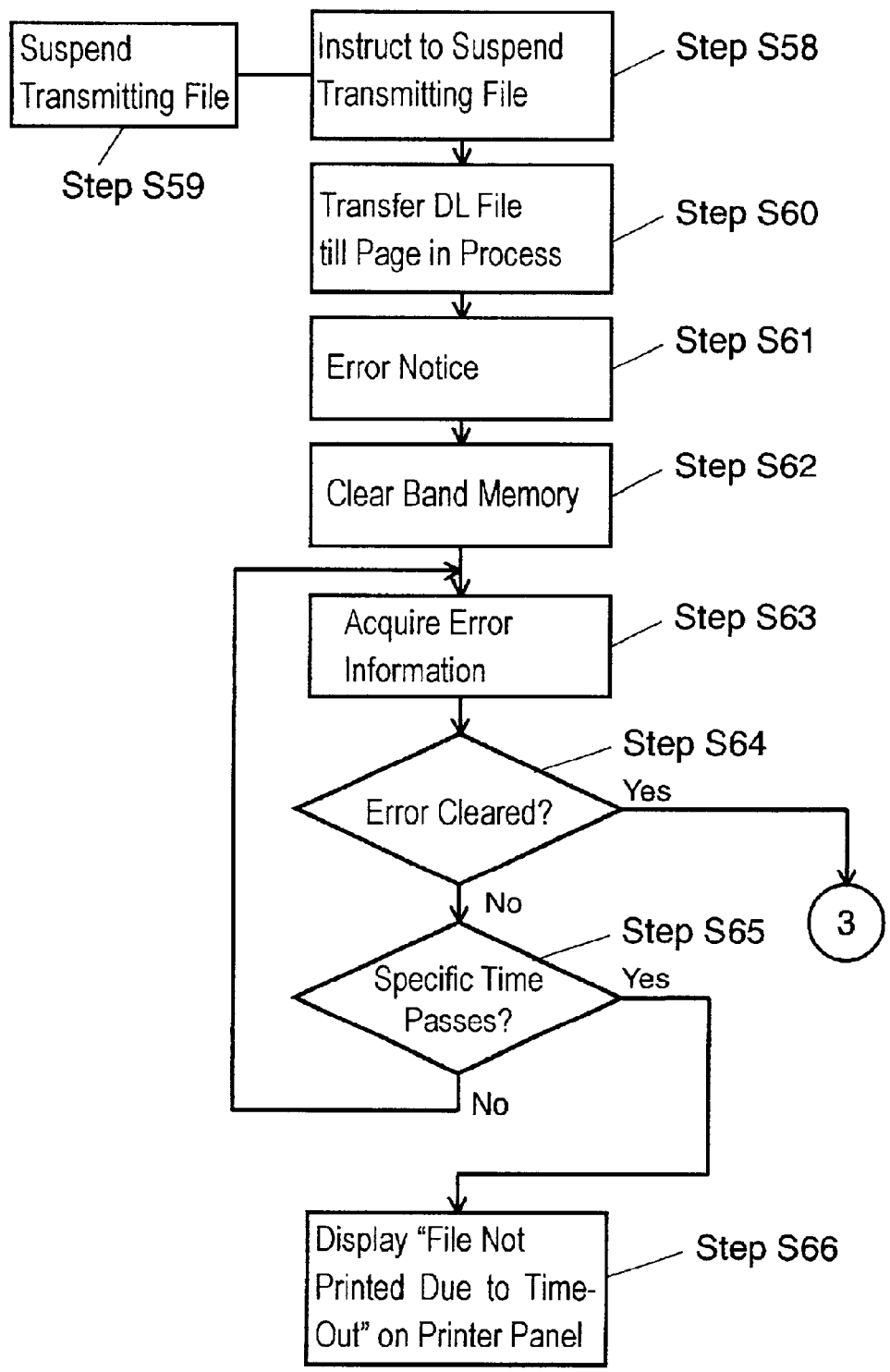
FIG. 12 is a flowchart of an operation in the case of an error of the network print system in embodiment 2.
Figure 13:
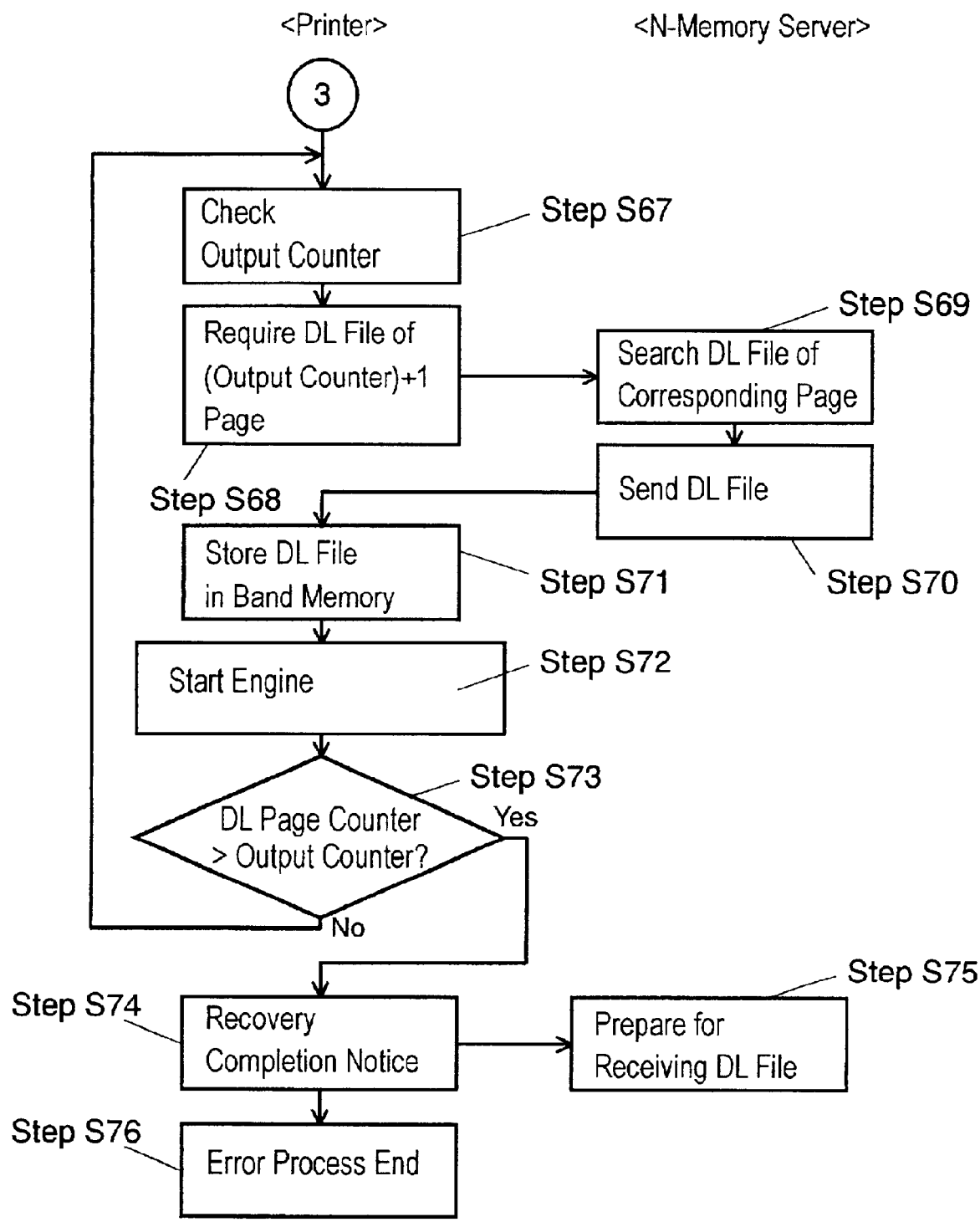
FIG. 13 is a flowchart of an operation in the case of an error of the network print system according to embodiment 2.

FIG. 7 shows a configuration of a network print system according to exemplary embodiment 2 of the present invention. FIG. 8 is a block diagram showing a hardware configuration of the system. FIG. 9 is a block diagram showing a software configuration of the system. FIG. 10 and FIG. 11 are flowcharts of a normal operation of the system. FIG. 12 and FIG. 13 are flowcharts of an operation in the case of an error in the system.

As shown in FIG. 7, in the network print system of the embodiment, a printer 43 is connected to a network memory (N-Memory) server 45 so as to communicate with each other through a LAN 41, a communication network. A file to be instructed to output by an application software on an operation controller 42 connected to the LAN 41 is transmitted to the printer 43 through a server (not shown). The file is then expanded, stored in the N-Memory server 45, and printed out by the printer 43.

The configuration of the printer 43 and N-Memory server 45 is shown in FIG. 8.

The printer 43 comprises a controller 46 for expanding the received data from the LAN 41 into bit map data, and an engine 47 for printing out the expanded data. The controller 46 includes an input unit 48 for receiving an output file of the operation controller 42 through the LAN 41, an interpretation controller 49 for converting the input data into a display list (DL) file in a printer intermediate language, an expansion controller 52 for expanding the DL file into bit map data, a band memory 50 for storing the DL file or expanded bit map data, an output controller 53 for issuing the bit map data in the band memory 50 to the engine 47, and an N-Memory input/output unit 54 for exchanging the DL file with the N-Memory server 45. The engine 47 includes a jam detector 55 for detecting paper jamming, a toner empty detector 56 for detecting shortage of a toner, and an output counter 57 for counting a number of delivered sheets.

The N-Memory server 45 includes a network input/output unit 59 connected to the LAN 41 for transmitting and receiving DL files, a hard disk drive (HDD) 58 storing received DL files, and an N-Memory controller 60 for controlling reading and writing necessary DL files by managing the input and output in the HDD 58.

In this embodiment, an inexpensive printer 43, for example, an ink jet printer or other inexpensive printer 43 is considered. In the printer 43, a memory storing a specific width of a page is provided instead of the page memory, and an image divided by the width is expanded, which is known as the band memory system.

FIG. 9 shows a software configuration of the printer 43 and N-Memory server 45. The control software of the printer 43 operates on a real-time OS (RTOS) 63 and includes a main task 69 for managing various tasks on the top of the software. On the one step lower than the main task 69, the software includes a multiple original prints (Mopy) task 67 for managing the Mopy output for shortening the output time by storing the DL file in the N-Memory server 45 and reissuing this file for the second and successive outputs, and each task 68 for controlling other operations in the printer. These tasks must use commonly an internal memory 61 built in the printer 43 and an external memory using the N-Memory server 45 through the LAN 41. the controlling of the tasks are managed by a memory management function 66. On the one step lower than the memory management function 66, the software includes a memory management function 64 for handling the internal memory 61, and an N-Memory management function 65 for handling the external memory of the N-Memory server 45. The software further includes a network driver 62 for controlling the network.

The N-Memory server 45 is realized by a computer such as a personal computer (PC), and in this case it operates on a desktop OS 71. An N-Memory server application 72 controls an internal memory 70 and the HDD 58, and exchanges DL files with the printer 43 through the network driver 62.

In the network print system having such configuration, an operation of error recovery by employing the DL files in N-Memory server 45 in the case of an error is explained by referring to FIG. 10 to FIG. 13.

A user instructs an output of data such as application data to the printer 43 from the operation controller 42, and transfers the files (step S41). As a result, the output file is sent to the printer 43 through the server (not shown). In the printer 43, the DL page counter and DL band counter are reset to zero, and then, the files are sequentially converted into DL files by the interpretation controller 49, and expanded in the band memory 50 (step S42). Simultaneously, the controller 49 transfers the DL files also to the N-Memory server 45 (step S43). The server 45 stores the DL files in the HDD 58 along with the file ID, page information, and band information (step S44). Upon storing the DL files, the server 45 returns an OK Acknowledgement (ACK) to the printer 43 (step S45). In the printer 43, the expansion controller 52 expands the DL files as bit map data into the band memory 50 again, and instructs a print output of the files to the engine 47 after confirming the ACK received from the N-Memory server 45 (step S46). During the output, the output controller 53 monitors an error situation in the engine 47 (step S47), and judges if an error has occurred or not (step S48). If an error occurs in the engine 47, the error is processed (step S49). When the files are normally output without an error, the DL band counter counts up by one (step S50). It is judging if the DL file is the final band or not (step S51). If it is not the final band, the process returns to step S42, and data in successive bands is output. When the final band is output, the DL page counter counts up by one (step S52). It is judged if the DL file is the final page or not (step S53). If it is not the final page, the process returns to step S42, and data of successive pages is similarly output. When confirming to complete outputting the final page, the printer 43 specifies a file ID to the server 45, and instructs to delete the DL file corresponding to the ID (step S54). Thus, the server 45 deletes the DL file on the HDD 58 (step S55), and returns the completion notice to the printer 43 (step S56). Upon confirming the completion notice from the server 45, the printer 43 finishes the operation (step S57).

An error processing at step S49 will specifically be explained by referring to FIG. 12 and FIG. 13. In the case of an error, the printer 43 instructs the operation controller or a server (not shown) transmitting data to suspend transmitting the data after the page being processed when receiving data (step S58). Detecting this instruction, the operation controller 42 or the server (not shown) suspends transmitting the data (step S59). Then the printer 43 continues to transfer the DL file up to the page being processed to the N-Memory server 45 (step S60), and notices occurrence of the error to the N-Memory server 45 (step S61). Then, the printer 43 clears the band memory 50 (step S62), and monitors and acquires error information from the engine 47 (step S63). It is judged if the error is cleared or not thanks to, for example, that the user removes the jamming paper from the printer 43 (step S64). If the error is not cleared, It is judged if a specific time passes from the occurrence of the error with a timer (step S65). If the specific time does not pass at step S65, back to step S63, the printer 43 acquires the error information again. If the specific time passes at step S65, the message telling the data is not printed out due to expiration is displayed on the printer panel, and the process is over (step S66). In this case, the user eliminates the error and can instruct data output again through the operation controller 42.

When the error is cleared at step S64, the printer 43 checks the output counter 57 in the engine 47 (step S67). Obtaining a number (N) on the output counter, the printer 43 requests, to the N-Memory server 45, transmitting the DL file on a page of a number (N+1) on the output counter for recovering an image (step S68). The server 45 searches the DL file on the corresponding page (step S69), and transmits the DL file to the printer 43 (step S70). At this time, the server 45 sequentially transmits bands from the first one to the final one on the page while confirming the stop signal of flow control from the printer 43. The printer 43 stores the received DL file in the band memory 50 (step S71). The expansion controller 52 expands the DL file into the bit map, and puts in an empty area of the band memory 50, and starts up the engine 47 for data output as required (step S72). As soon as the band memory 50 is vacant, the DL file is sequentially received from the server 45. The printer 43 issues a stop signal of flow control when the band memory 50 is filled up. When the memory 50 is vacant thanks to output data, the stop signal is cleared. Thus, the printer 43, while arbitrating with the server 45, prints out the data in accord with engine speed.

At every output of one page, numbers on the DL page counter and the output counter are compared (step S73). When the number on the output counter is smaller, going back to step S67, the server 45 continues outputting data output because the printer needs to be recovered from the error. When the number on the output counter becomes equal to that on the DL page counter, the printer 43 sends a recovery-end notice to the server 45 (step S74). As a result, the N-Memory server 45 prepares again for receiving the DL file (step S75). Finally, the operation in the printer 43 finishes the error processing (step S76), and returns to step S50.

As described above, according to embodiment 2 of the invention, storing data simultaneously to output data, the N-Memory server 45 sends the stored DL file again to the printer 43 from the first band of the next page to the delivered page of the number on the output counter in the case of a printer error while arbitrating with the printer. Therefore, even an inexpensive printer without page memory, such as ink jet printer, is recovered from the error securely, and prints out data at a speed suited to the engine speed by the flow arbitration.

The input unit for receiving print data from the communication network and the memory data input/output unit for exchanging data in the printer intermediate language with the memory server through the network may be common.

A finisher is not always necessary for the operation, while the finisher 4 is connected in embodiment 1. If the finisher 4 is not connected, the output counter 57 in the engine 47 is utilized.

In the system shown in embodiments 1 and 2, after data output, the DL file in the N-Memory server is deleted. But being left, the file may be partially issued again, or issued for the second and successive outputs as the Mopy output.

The system according to embodiment 2 stores all bands on the page in process in the case of an error in the N-Memory server 45, and then, recovers from the error in the unit of a page. The system, in the case of an error, may stop immediately storing bands to one in process in the N-Memory server 45, and then, recovers from the error in the unit of a band based on numbers on the DL page counter and the DL band counter. In this case, although the processing for the recovery from the error relatively complicated in error recovery, the system recovers from the error fast.

In the embodiment of the invention, the N-Memory server 45 is often realized by the PC, but it may be also realized by a general-purpose computer, work station, or other printer incorporating a memory and an HDD.

The invention may be modified in various modes without departing from the spirit of the invention.

Exemplary Embodiment 3

Figure 14:
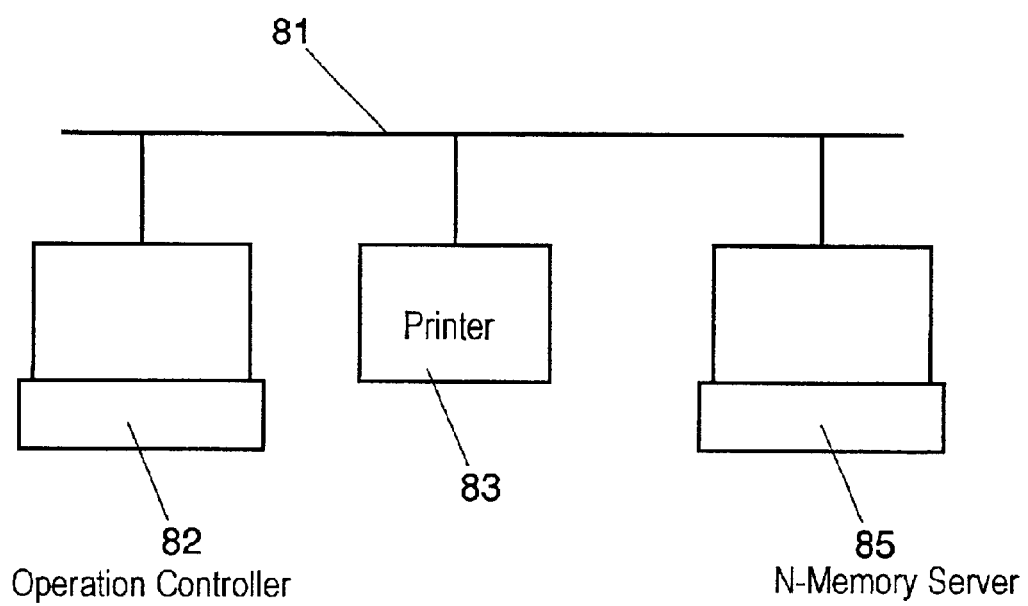
FIG. 14 shows a configuration of a network print system according to exemplary embodiment 3 of the present invention.
Figure 15:
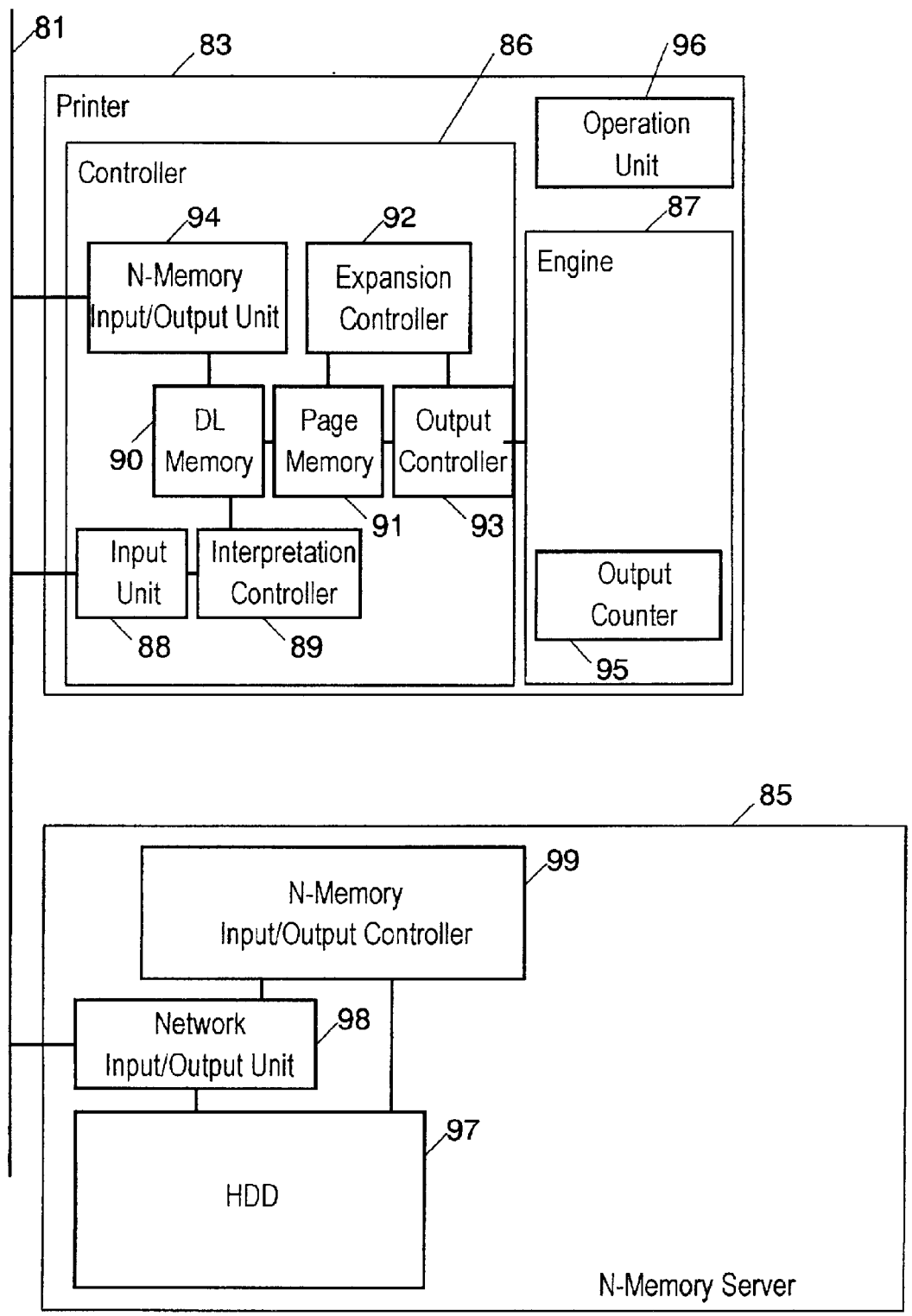
FIG. 15 is a block diagram showing a hardware configuration of the network print system according to embodiment 3.
Figure 16:
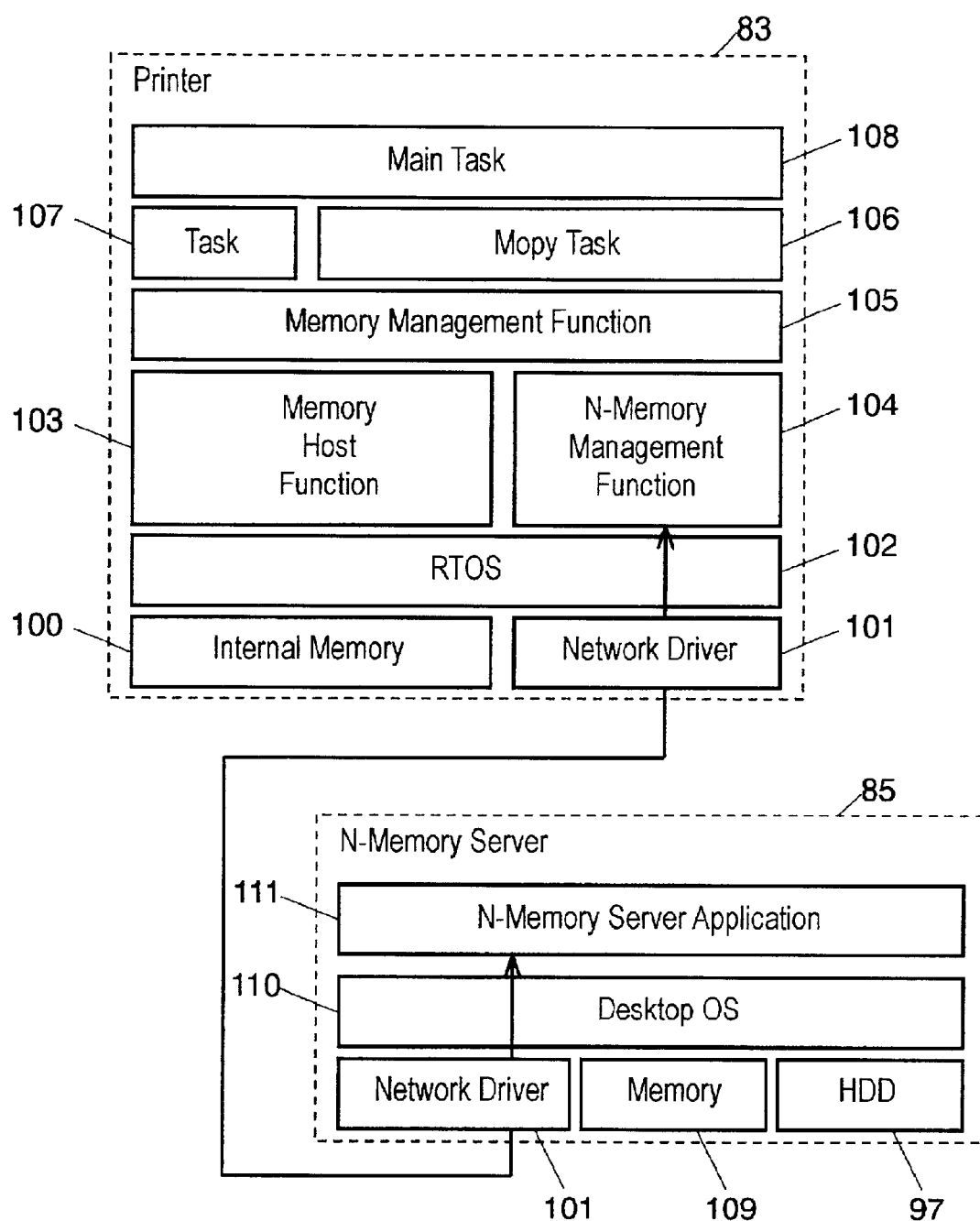
FIG. 16 is a block diagram showing a software configuration of the network print system according to embodiment 3.
Figure 17:
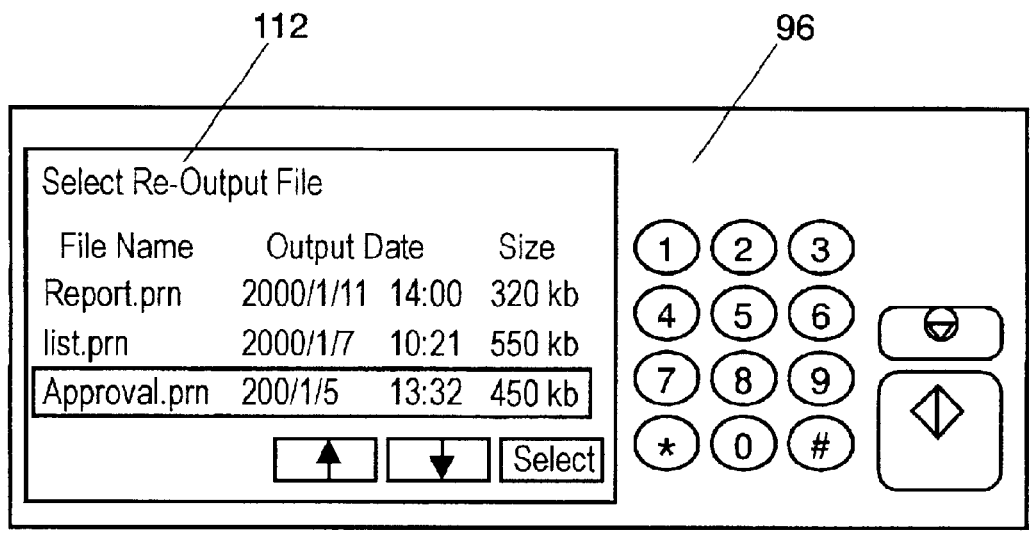
FIG. 17 shows an operation unit of the printer according to embodiment 3.
Figure 18:
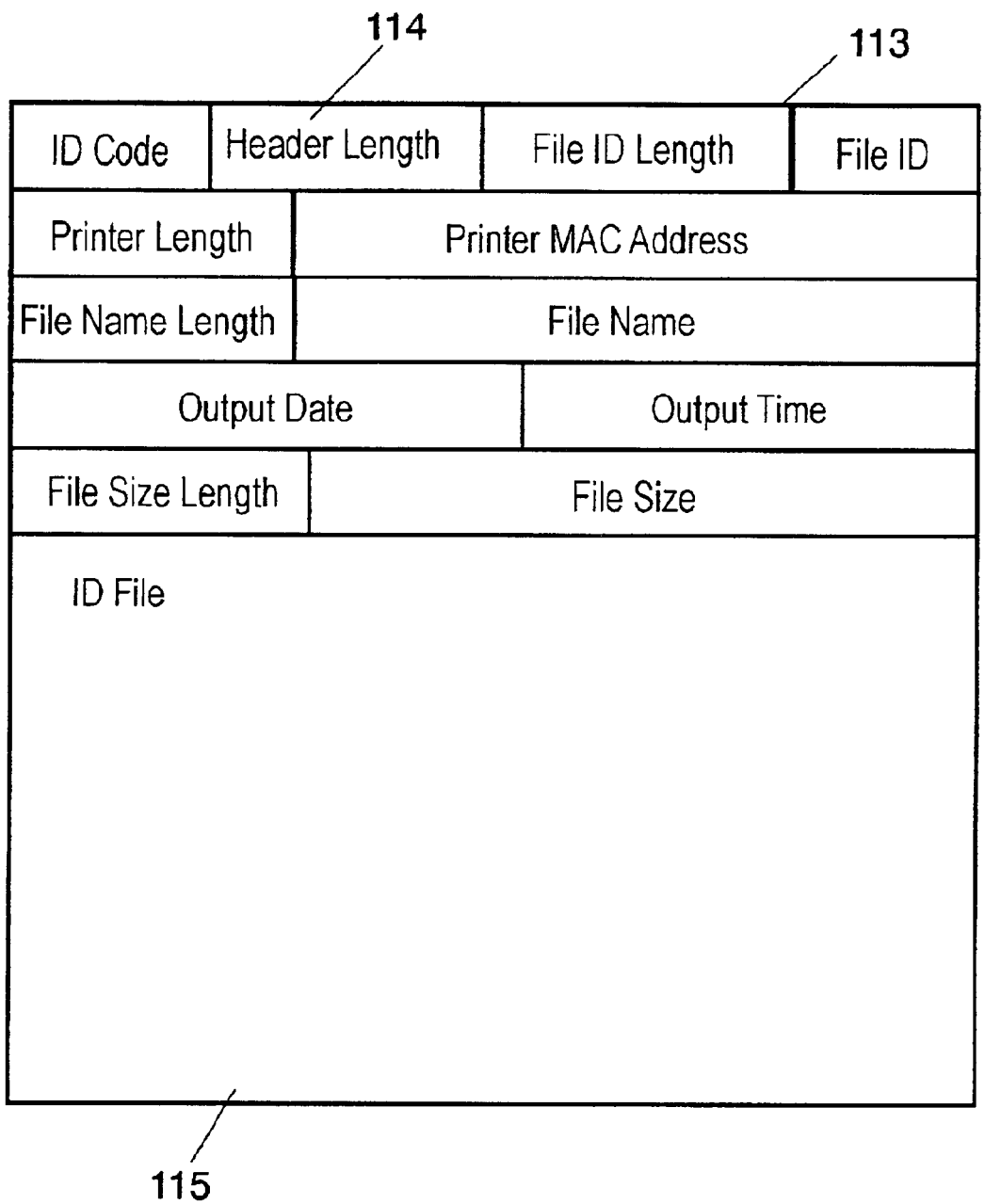
FIG. 18 shows a composition of an N-Memory file according to embodiment 3.
Figure 19:
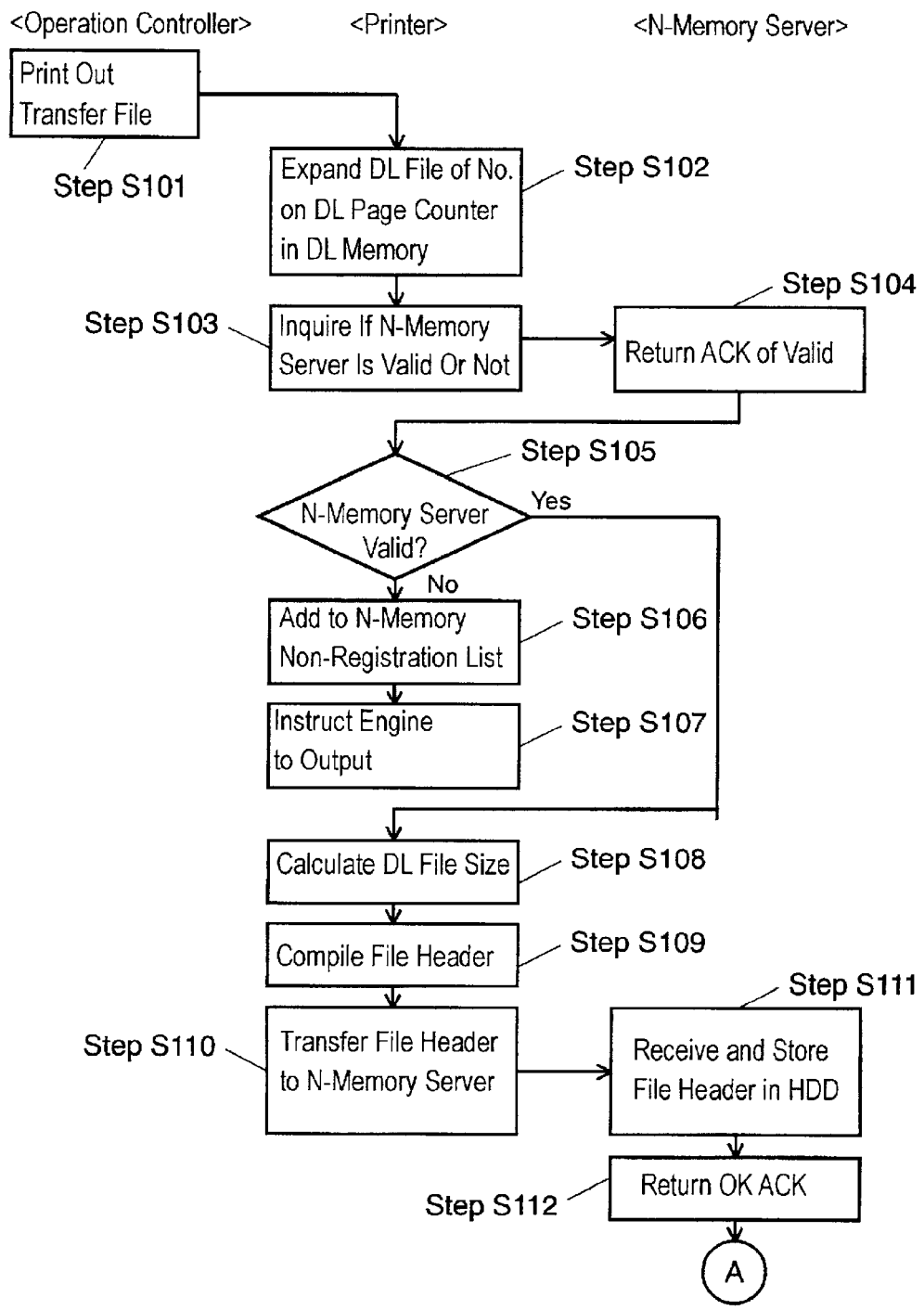
FIG. 19 is a flowchart of an output operation of the network print system according to embodiment 3.
Figure 20:
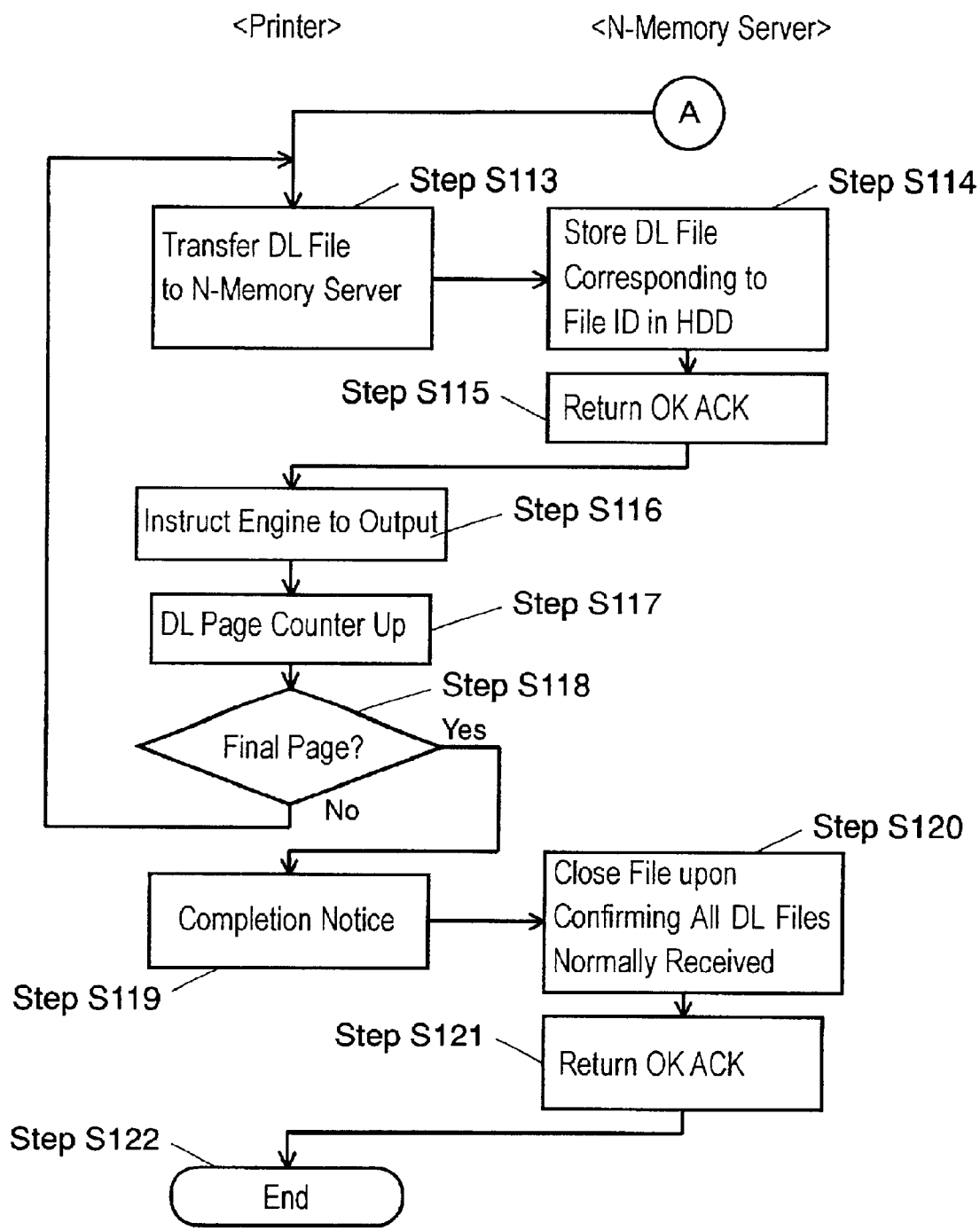
FIG. 20 is a flowchart of an output operation of the network print system according to embodiment 3.
Figure 21:
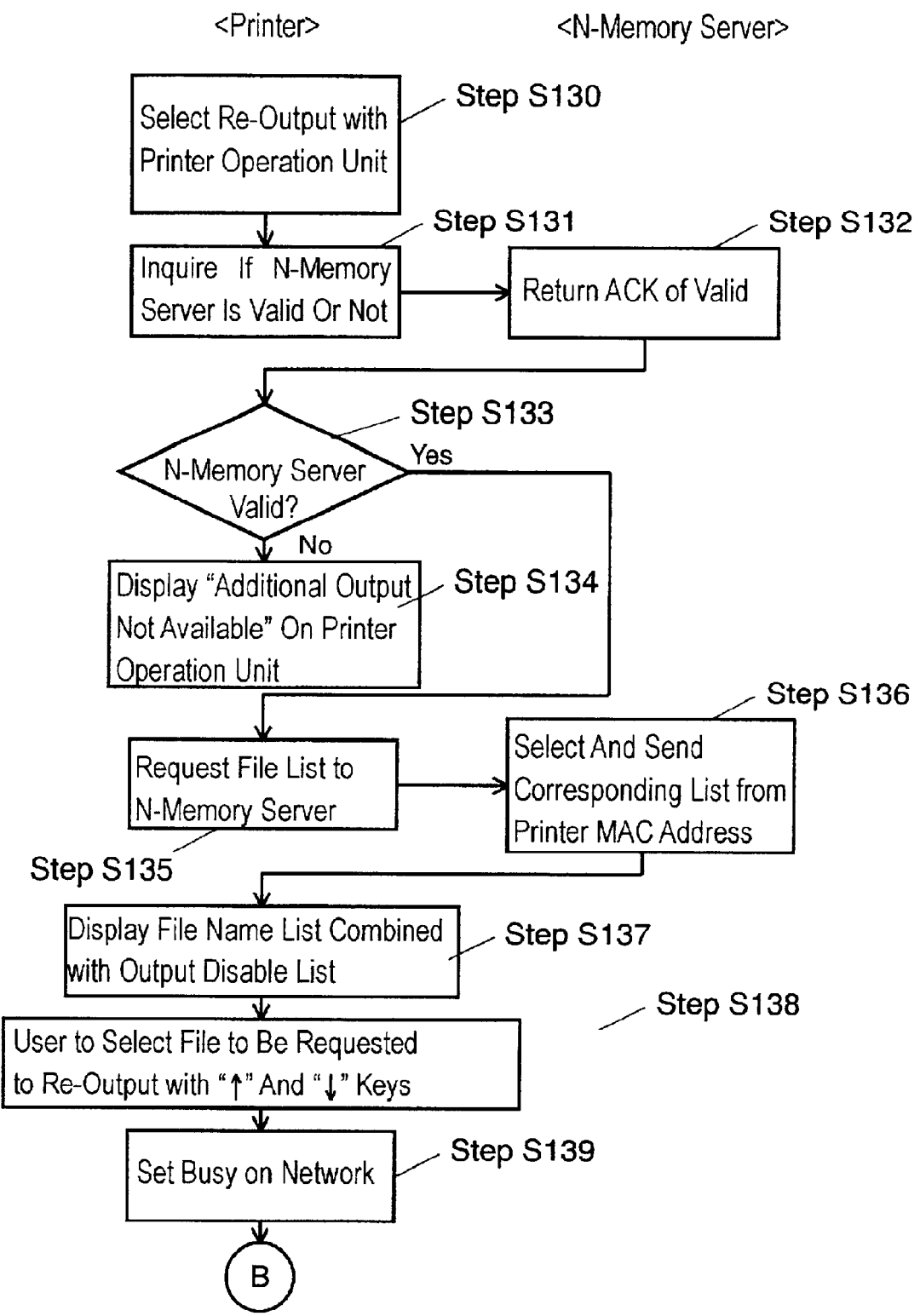
FIG. 21 is a flowchart of a re-output operation of the network print system according to embodiment 3.
Figure 22:
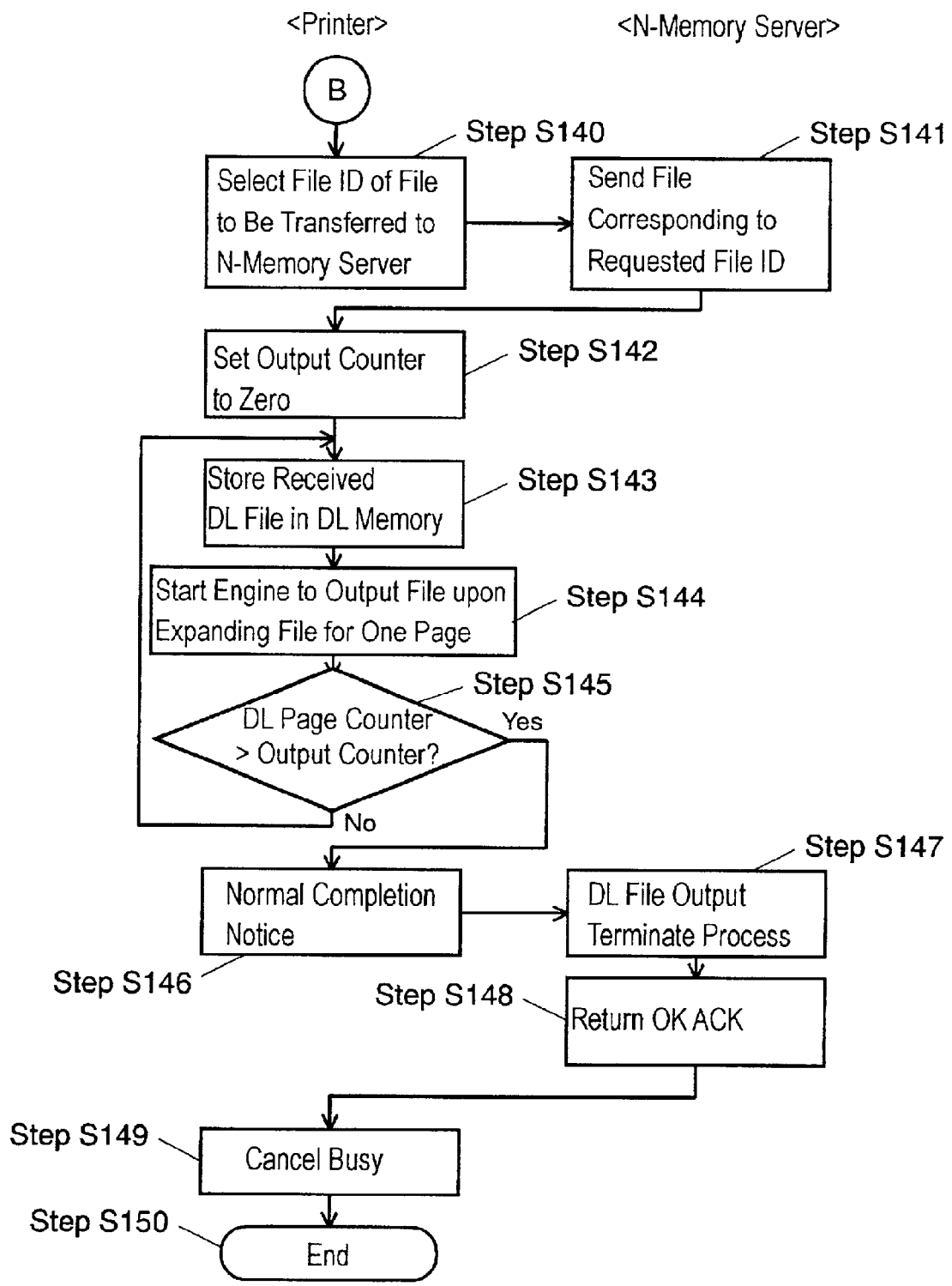
FIG. 22 is a flowchart of a re-output operation of the network print system according to embodiment 3.

FIG. 14 shows a configuration of a network print system according to exemplary embodiment 3 of the present invention. FIG. 15 is a block diagram showing a hardware configuration of the system, and FIG. 16 is a block diagram showing a software configuration of the system. FIG. 17 shows an operation unit of the printer according to embodiment 3. FIG. 18 shows a composition of a network memory (N-Memory) file according to embodiment 3. FIG. 19 and FIG. 20 are flowcharts of an output operation in the system. FIG. 21 and FIG. 22 are flowcharts of a re-output operation in the system.

As shown in FIG. 14, in the network print system according to the embodiment, a printer 83 is connected to a network memory (N-Memory) server 85, a memory medium, communicating with each other through a LAN 81, a communication network. A file to be instructed to output by an application software on an operation controller 82 connected to the LAN 81 is transmitted to the printer 83 through a server (not shown). The file is then converted into a display list (DL) file in a printer intermediate language in the printer 83, stored in the N-Memory server 85, and printed out.

The configuration of the printer 83 and N-Memory server 85 is shown in FIG. 15.

The printer 83 comprises a controller 86 for expanding the received data from the LAN 81 into bit map data, an engine 87 for outputting the expanded data, and an operation unit 96 for displaying the output status of files and operating file re-output. The controller 86 includes an input unit 88 for receiving an output file of the operation controller 82 through the LAN 81, an interpretation controller 89 for converting the input data into a DL file, a DL memory 90 storing the DL file, an expansion controller 92 for expanding the DL file into bit map data, a page memory 91 storing the expanded data, an output controller 93 for outputting the onepage data to the engine 87, and an N-Memory input/output unit (memory data input/output unit) 94 for exchanging the DL file with the N-Memory server 85. The engine 87 includes an output counter 95 for counting the number of delivered sheets.

The N-Memory server 85 includes a network input/output unit 98 connected to the LAN 81 for transmitting and receiving DL files, a hard disk drive (HDD) 97 storing the received DL files, and an N-Memory controller 99 for controlling reading and writing necessary DL files by managing the input and output in the HDD 97.

FIG. 16 shows a software configuration of the printer 83 and N-Memory server 85.

The control software of the printer 83 operates on a real-time OS (RTOS) 102, and includes a main task 108 for managing various tasks on the top. On the one step lower than the main task 108, the software includes a multiple original prints (Mopy) task 106 for managing a Mopy output for shortening an output time by storing the DL file in the N-Memory server 85 and reissuing this file for second and successive outputs, and a task 107 for controlling other operations in the printer. These tasks must use commonly an internal memory 100 built in the printer 83 and an external memory using the N-Memory server 85 through the LAN 81. The controlling of the tasks is managed by a memory management function 105. On the one step lower than the memory management function 105, the software includes a memory management function 103 for handling the internal memory 100, and an N-Memory management function 104 for handling the external memory in the N-Memory server 85. The software further includes a network driver 101 for controlling the network.

The N-Memory server 85 is realized by a computer such as a personal computer (PC), and in this case, it operates on a desktop OS 110. An N-Memory server application 111 controls an internal memory 109 and the HDD 97, and exchanges DL files with the printer 83 through the network driver 101.

As shown in FIG. 17, the operation unit 96 of the printer 83 includes a display unit 112 such as liquid crystal display, numeric keys, and an execution key. The display unit 112 displays a list of DL files of images which are stored in the N-Memory server 85 and once output by the printer 83. Files not stored in the server 85 are distinguished from others and are shown, for example, in gray display. One of the files is shown as a file "Approval.prn" in FIG. 17.

FIG. 18 shows a composition of an N-Memory file 113 exchanged between the printer 83 and N-Memory server 85. The file 113 is composed of a file header 114 and a DL file 115. The header 114 includes an identification code identifying the header, a header length of the header 114, a file ID for identifying a file, a file ID length of the file ID, a printer MAC address of the printer outputting the file, a printer length of the address, an output file name, a file name length of the name, output date, an output time, a size of the output file, and file size length of the size.

The DL file 115 in a printer intermediate language is transferred to the N-Memory server 85 simultaneously to its output.

In the network print system having such configuration, the output instruction operation from the operation controller 82, a client, and the re-output operation through the operation unit 86 will be explained below by referring to FIG. 19 through FIG. 22.

A user instructs an output of data such as application data to the printer 83 through the operation controller 82, and transfers the file (step S101). As a result, the output files are sent to the printer 83 through the server (not shown). In the printer 83, the DL page counter is first reset to zero, the files are sequentially converted into DL files by the interpretation controller 89, and a DL file corresponding to a number on the DL page counter is expanded in the DL memory 90 (step S102). After expanding it for one page, the printer 83 inquires if the N-Memory server 85 is valid or not (step 103). Upon receiving the inquiry and recognizing valid, the server 85 returns acknowledgement (ACK) (step S104). If the ACK does not return within a specified time due to the stop of the server 85 or a trouble on the LAN 81, the printer 83 judges that the server 85 is invalid (step 105). If it is invalid, the printer 83 adds information of the output file to a non-registration list (step S106), and instructs an ordinary data output to the engine 87 (step S107). At step S105, if the server 85 is valid, the printer 83 calculates the size of each of the DL files (step S108), and compiles the file header 114 shown in FIG. 18 (step 109). The header 114 is transferred to the server 85 (step S110). The N-Memory server 85 stores the received header 114 in the HDD 97 (step S111), and returns an OK acknowledgement (ACK) to the printer 83 (step S112). The printer 83, upon confirming the ACK, transfers the DL file on the first page to the server 85 (step S113 in FIG. 20). The server 85, upon receiving the DL file, stores the file corresponding to the file ID stored in the HDD (step S114), and then returns an OK acknowledgement (ACK) to the printer 83 (step S115). Upon confirming the ACK, the printer 83 instructs the engine 87 to send the DL file of the expanded first page (step S116). The DL page counter counts up by one (step S117). The printer 83 checks if the DL file is the final page or not (step S118). If it is not the final page, back to step S113, the second and successive pages are similarly processed. If it is the final page, the printer 83 issues an end notice to the server 85 (step S119). As a result, the server 85 confirms all DL files corresponding to the file ID are normally received, closes the files (step S120), and returns an OK ACK to the printer 83 (step S121). The printer 83, upon confirming the ACK, terminates the operation (step S122).

The process where the N-Memory server 85 re-outputs an image will be explained by referring to FIG. 21 and FIG. 22. A user selects a re-output function in the operation unit 96 of the printer 83 (step S130). The printer 83 inquires the N-Memory server 85 whether the server 85 is valid or not (step S131). The server 85, upon receiving the inquiry and recognizing valid, returns an ACK (step S132). If the ACK does not return within a specified time due to a stop of the server 85 or a trouble on the LAN 81, the printer 83 judges the server 85 is invalid (step S133). If it is invalid, the display unit 112 of the operation unit 96 displays a message "No Additional Output Is Available" (step S134). If the server 85 is valid, the printer 83 requests a list of files that can be reissued to the server 85 (step S135). The server 85 selects and sends an output list to the printer 83 of the MAC address (step S136). The printer 83 combines the received output list and the output disable list compiled at step S106, and displays file names in the combined list on the display unit 112 of the operation unit 96 (step S137). FIG. 17 shows an image on the display unit at this time. In the diagram, the output disable file is indicated by gray.

With pressing an up or a down arrow key shown in FIG. 17, a user selects a desired file to be re-output (step S138), while he/she cannot select the output disable file at this time.

By being set busy on the network (step S139), the printer 83 does not accept output requests from the server (not shown) or other operation controller 82, and makes them wait to request. The printer 83 transmits the file ID selected by the user to the N-Memory server 85 (step S140). The server 85 transmits the first page of the DL file corresponding to the file ID (step S141). The printer 83 resets the output counter 95 to zero (step S142), receives the DL file of the first page, and stores it in the DL memory 90 (step S143). When the file is expanded for one page, the engine 87 starts up (step S144). The printer 83 monitors a number on the output counter 95, and compares the number with that on the DL page counter (step S145). If the number on the output counter is smaller, back to step S143, the printer 83 subsequently stores the DL file of the second page in the DL memory. At step S145, when the final page is output, and when numbers on the DL page counter and the output counter become equal, the printer 83 notices a normal output to the server 85 (step S146). And then, the server 85 processes to terminate the DL file output (step S147), and sends an OK ACK to the printer 83 (step S148). The printer 83 cancels the busy state on the network (step S149), and terminates the operation (step S150).

According to embodiment 3, the DL file is stored in the N-Memory server 85 simultaneously to the output of the printer 83, and selected with the operation unit 96, so that the file is read out again and additionally output into the printer 83. Therefore, even the printer which do not incorporate a large capacity memory such as the HDD has the re-output function easily.

Simultaneously to an output of the printer 83, the DL file and file identification information are stored in the N-Memory server 85. When a file re-output is requested through the operation unit 96 of the printer 83, the file identification information is sent from the server 85 to the printer 83 so that a list of the files can be shown on the display unit 112 of the operation unit 96. Even if plural files are already output, a desired file can thus be selected without mistake.

Prior to the output of the printer 83 or an additional output of the N-Memory server 85, the printer 83 inquires whether the server 85 is valid or not. Thanks to it, the user easily recognizes that the server 85 is invalid due to a trouble in the network or the server 85, and also whether the re-output function is available or not.

The input unit for receiving print data from the communication network and the memory data input/output unit for exchanging data in the printer intermediate language with the memory server through the communication network may be common.

Embodiment 4

Figure 23:
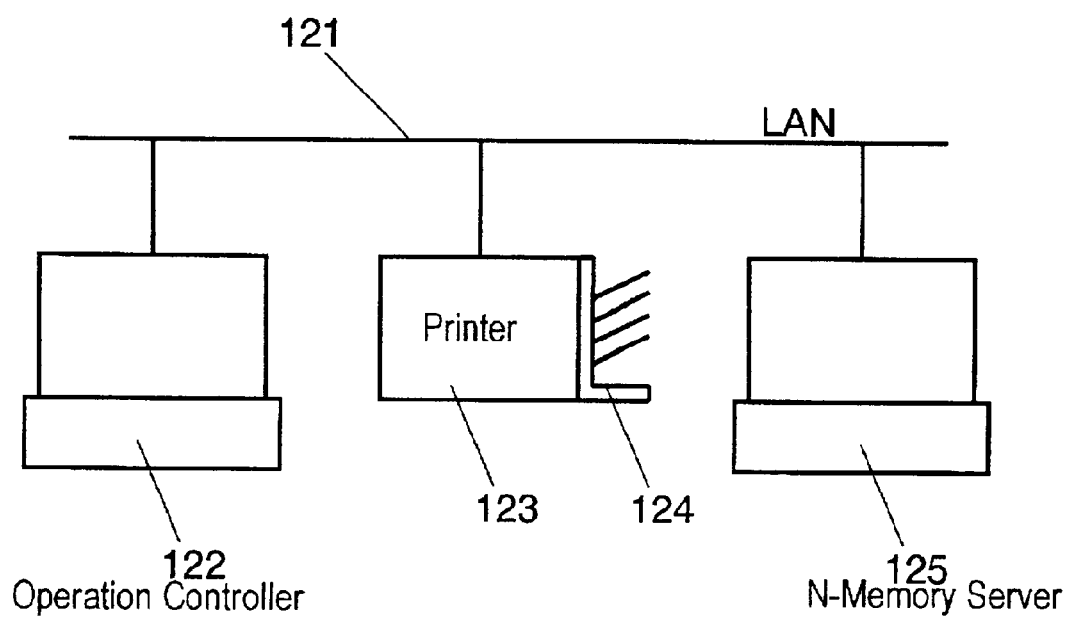
FIG. 23 is a schematic diagram of a configuration of a network print system according to exemplary embodiment 4 of the present invention.
Figure 24:
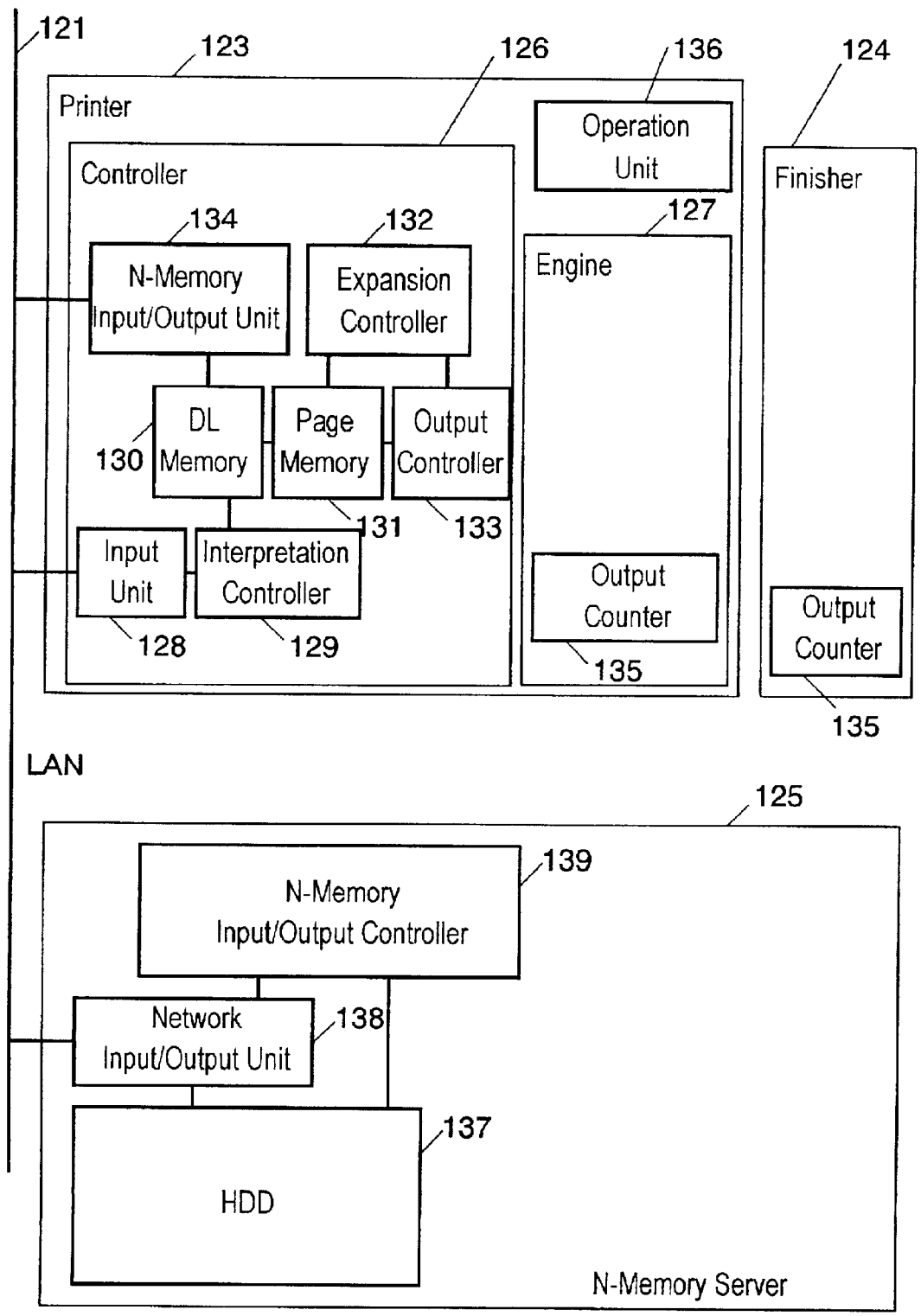
FIG. 24 is a block diagram showing a hardware configuration of the network print system according to embodiment 4.
Figure 25:
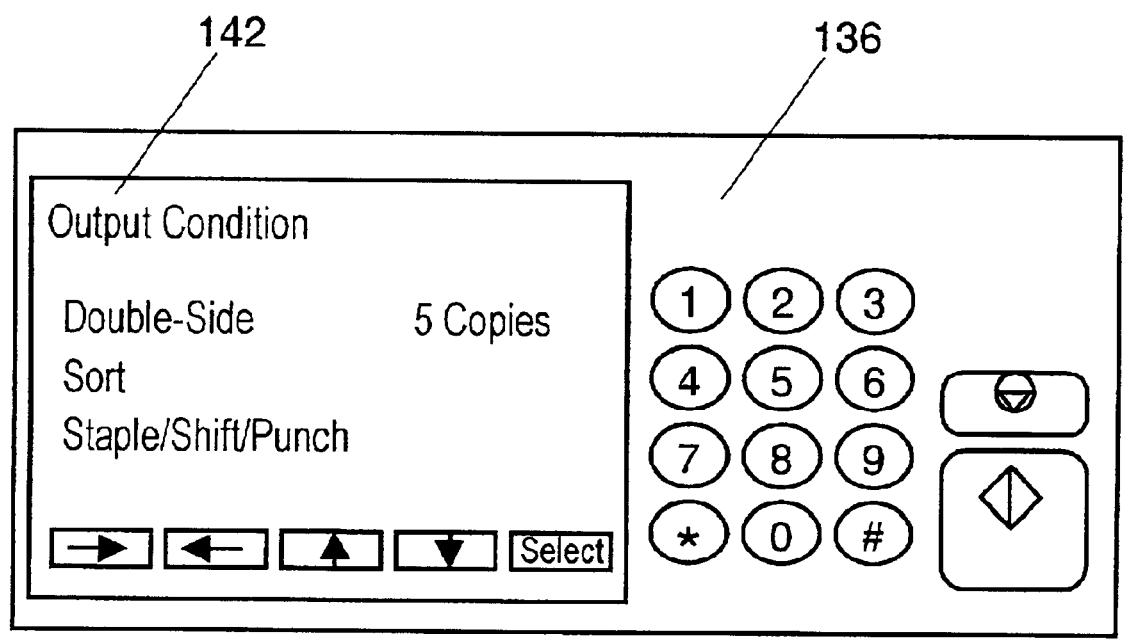
FIG. 25 shows an operation unit of the printer according to embodiment 4.
Figure 26:
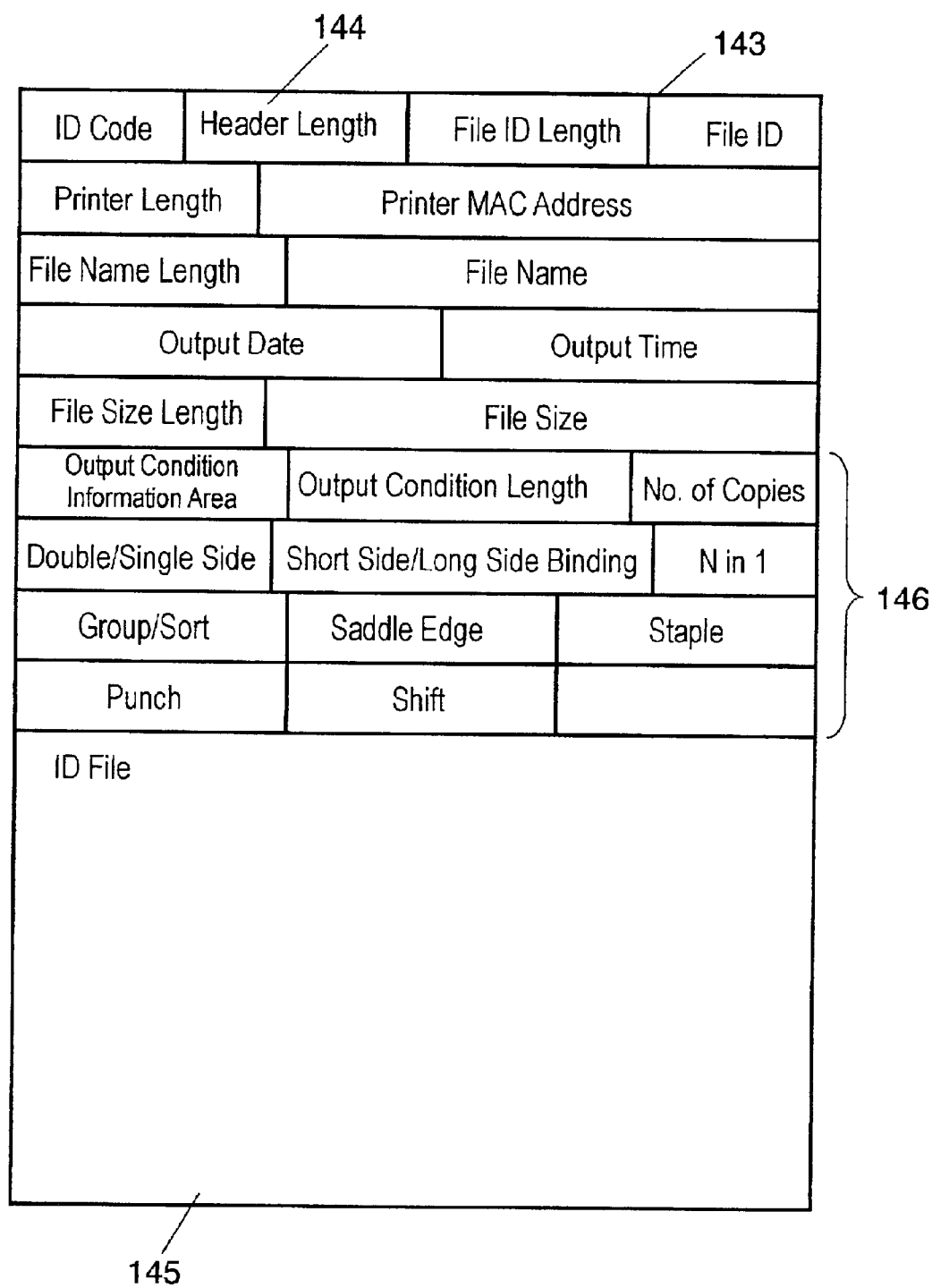
FIG. 26 shows a composition of an N-Memory file according to embodiment 4.
Figure 27:
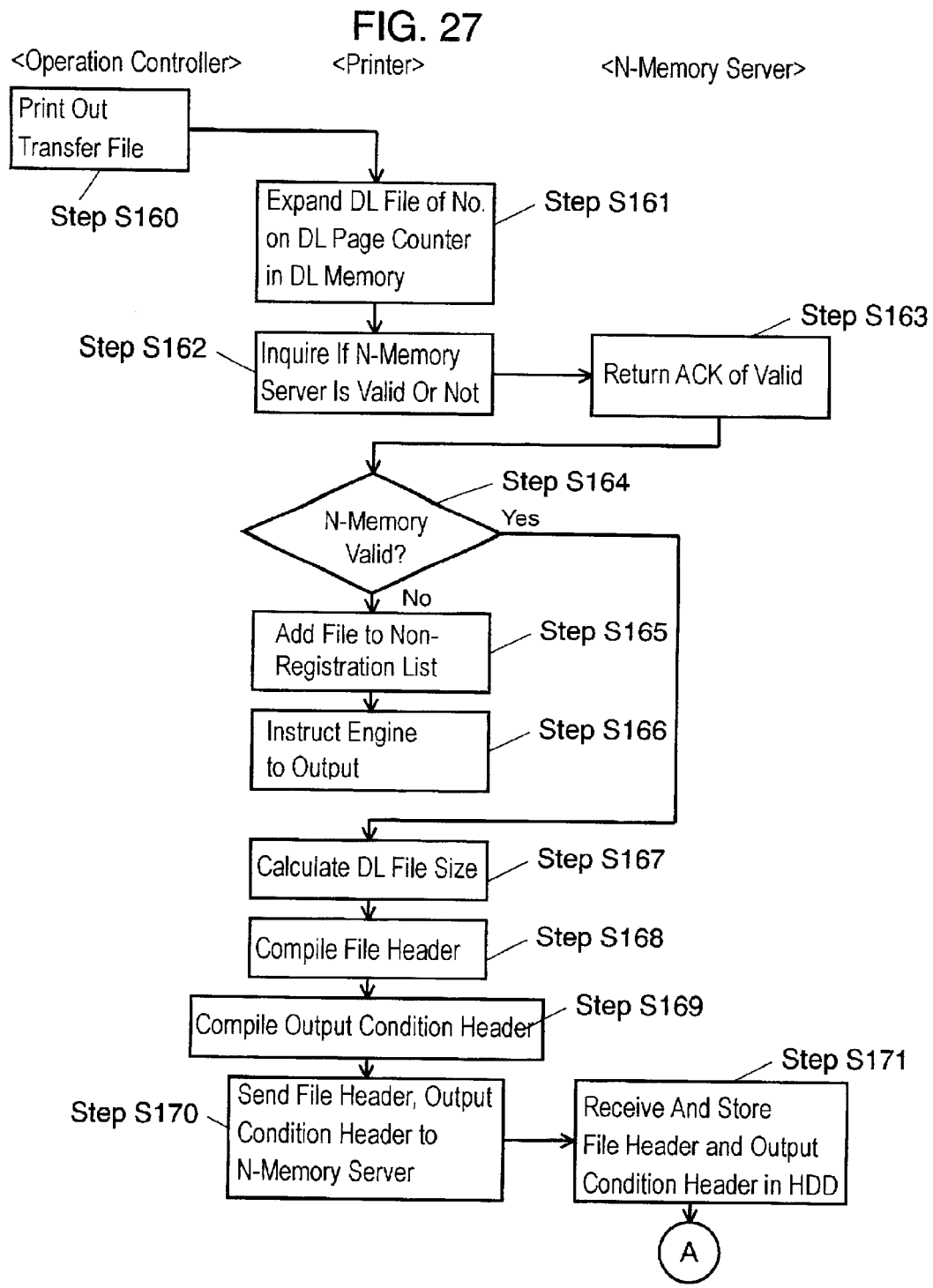
FIG. 27 is a flowchart of an output operation of the network print system according to embodiment 4.
Figure 28:
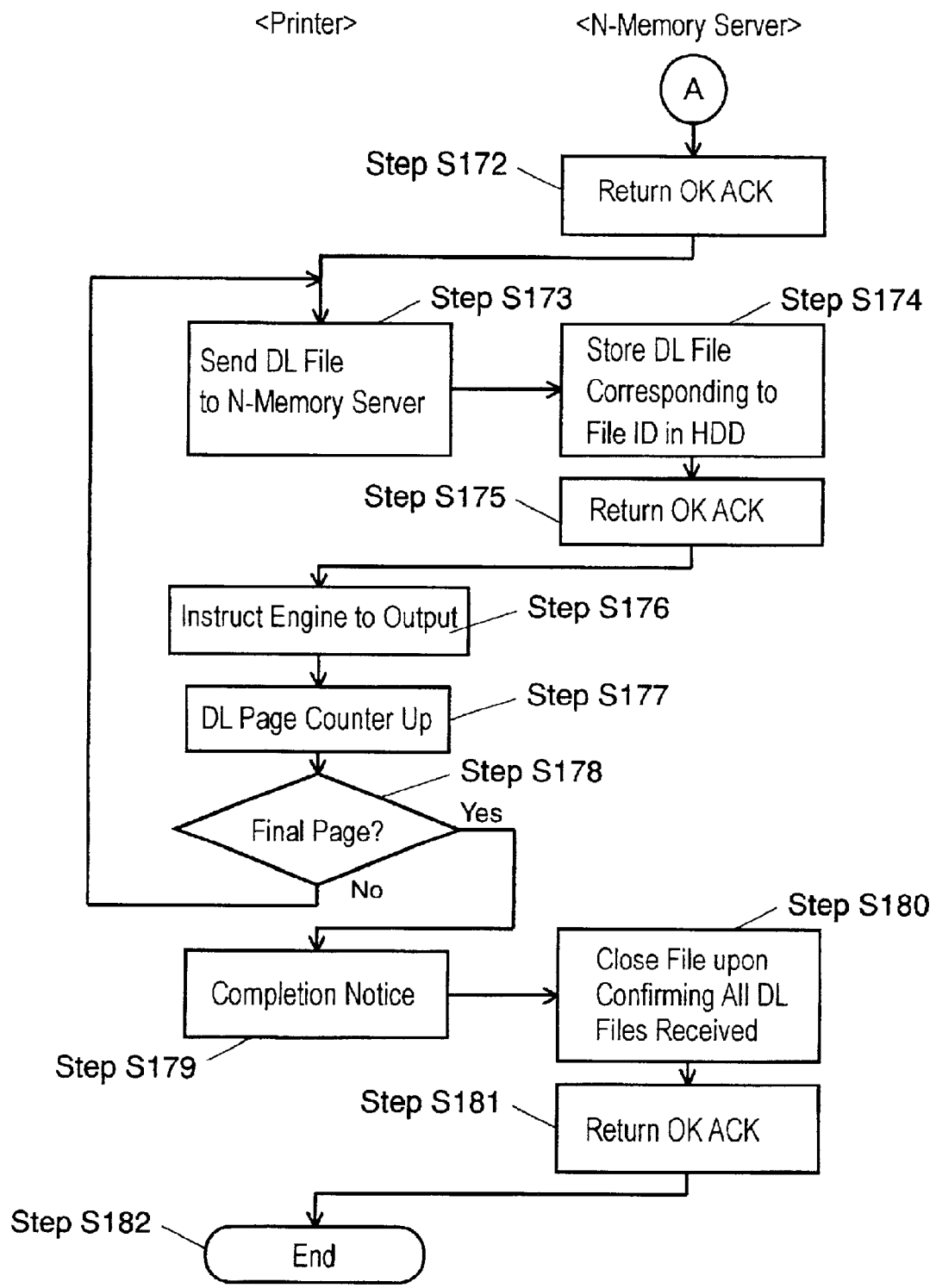
FIG. 28 is a flowchart of an output operation of the network print system according to embodiment 4.
Figure 29:
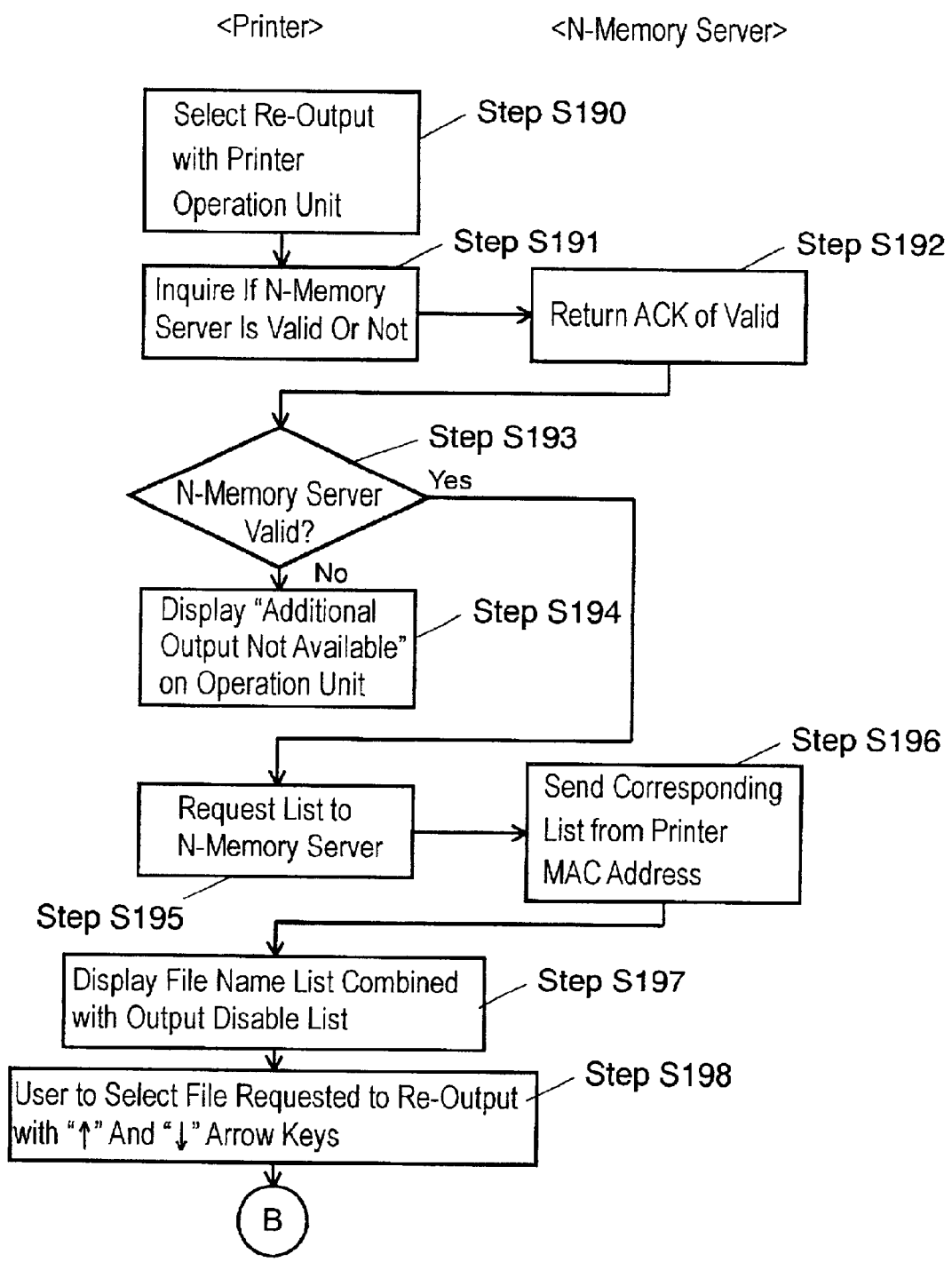
FIG. 29 is a flowchart of a re-output operation of the network print system according to embodiment 4.
Figure 30:
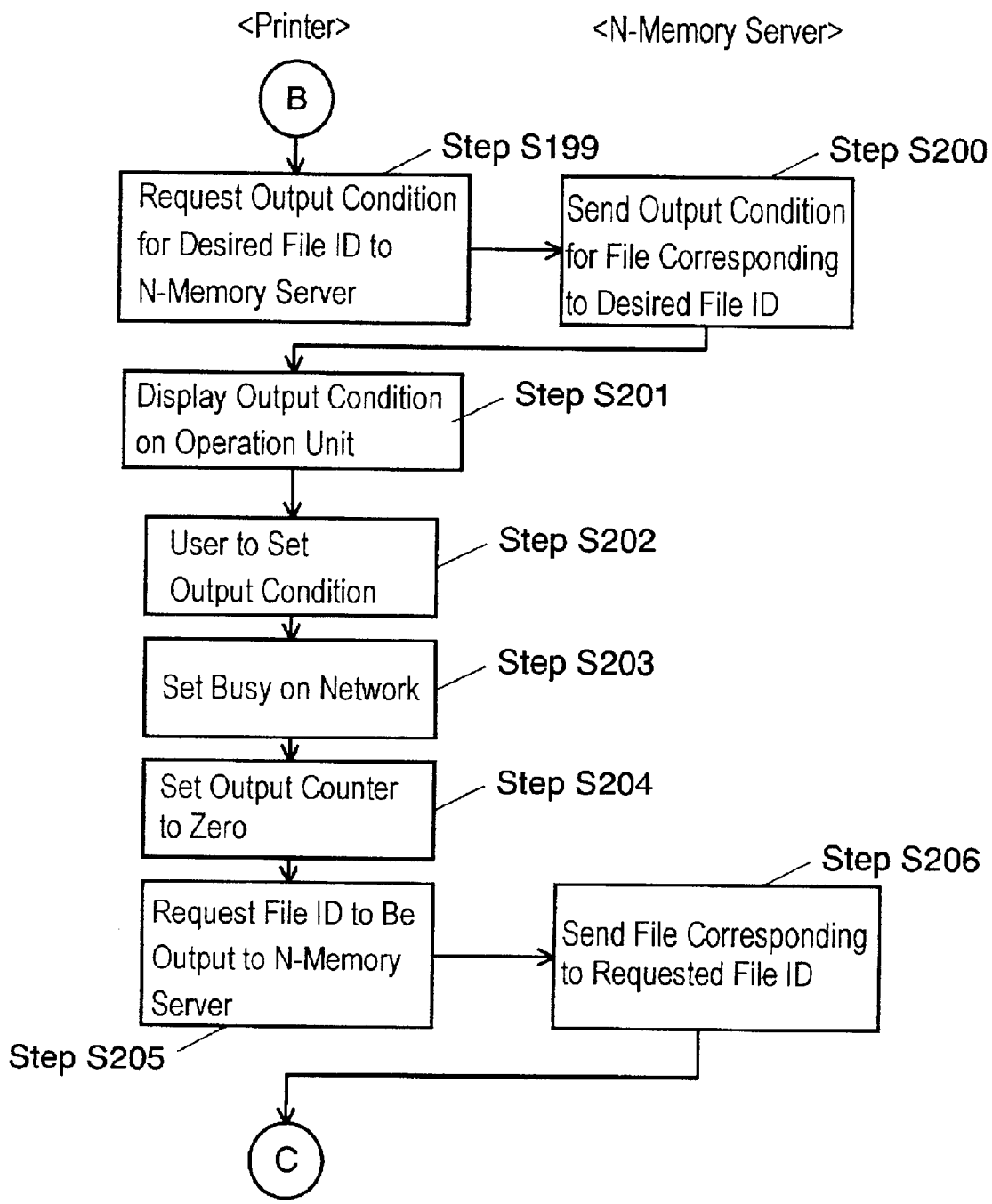
FIG. 30 is a flowchart of a re-output operation of the network print system according to embodiment 4.
Figure 31:
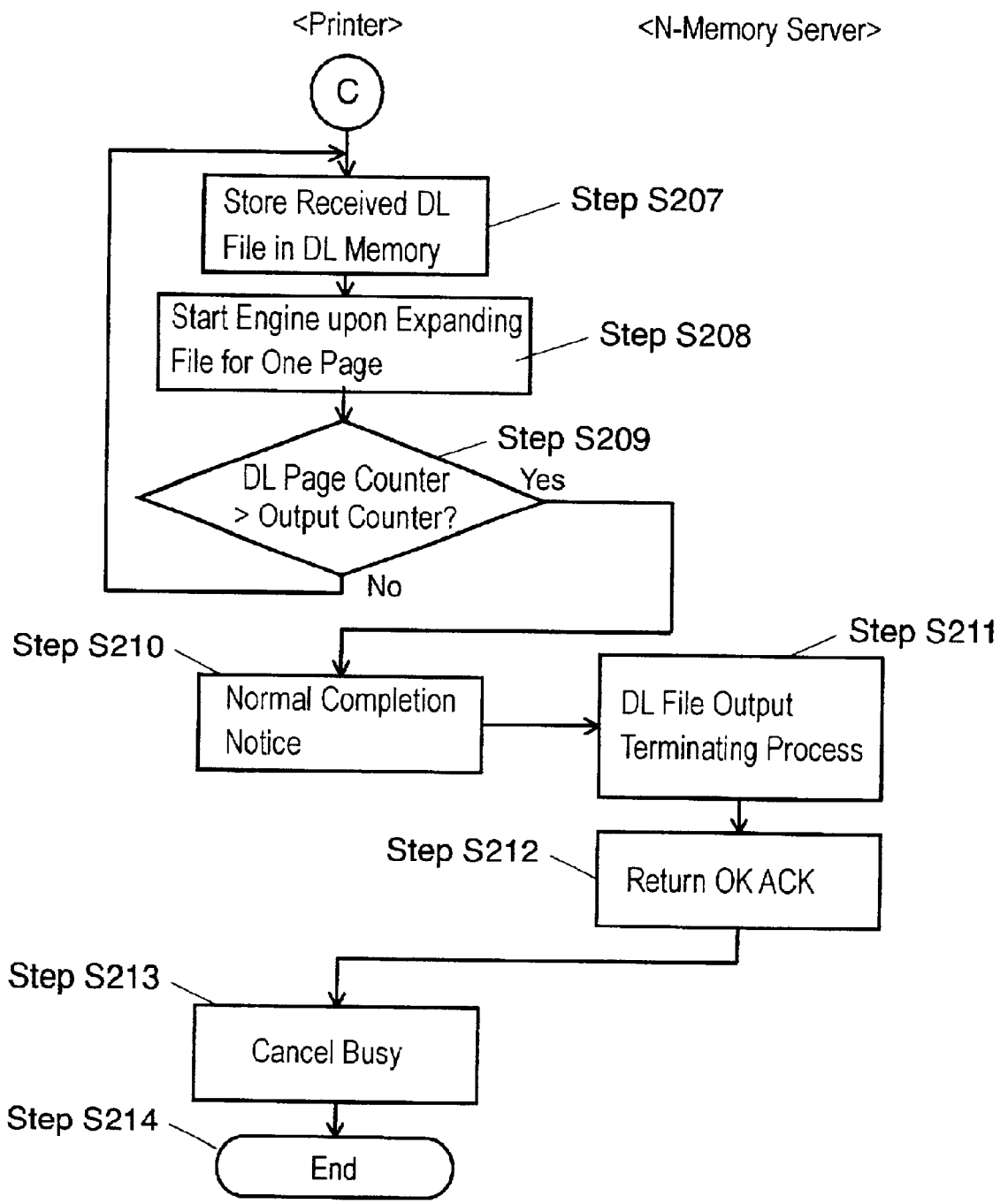
FIG. 31 is a flowchart of a re-output operation of the network print system according to embodiment 4.

FIG. 23 is a schematic diagram of a configuration of a network print system in embodiment 4 of the invention. FIG. 24 is a block diagram showing a hardware configuration of the system. FIG. 25 shows an operation unit of the printer. FIG. 26 shows a composition of a network memory (N-Memory) file. FIG. 27 and FIG. 28 are flowcharts of a data output operation of the system. FIG. 29 to FIG. 31 are flowcharts of a re-output operation of the system.

As shown in FIG. 23, in the network print system according to embodiment 4, a printer 123 and a finisher 124 are connected to a network memory (N-Memory) server 125 which is a memory medium so as to communicate with each other on a LAN 121, a communication network. A file to be instructed to output by an application software on an operation controller 122 connected to the LAN 121 is transmitted to the printer 123 through a server (not shown). The file is then converted into a display list (DL) file in a printer intermediate language in the printer 123, stored in the N-Memory server 125, and printed out.

The configurations of the printer 123, finisher 124 and N-Memory server 125 are shown in FIG. 24.

The printer 123 and N-Memory server 125 are composed same as in embodiment 3, and their description is omitted. The finisher 124 connected to the printer 123 includes an output counter 135 for counting the number of delivered sheets similarly to the printer 123.

FIG. 25 shows an operation unit 136 of the printer 123. The operation unit 136 includes a display unit 142 such as a liquid crystal display, together with numeric keys and an execution key. The display unit 142 shows the output condition of the file after a desired output file is selected on the screen in FIG. 17. The display unit 142 first shows a previous output condition, and a user sets the condition for re-outputting by changing selection items with up, down, right and left arrow keys.

FIG. 26 shows a composition of N-Memory file 143 exchanged between the printer 123 and N-Memory server 125. The file 143 is composed of file header 144, output condition header 146, and DL file 145. The header 144 and file 145 are same as in embodiment 3, and their description is omitted.

The output condition header 146 comprises the following components:

(a) An output condition information area showing output condition header, (b) An output condition length showing the length of the output condition header 146, (c) The number of output copies, (d) The classification of a double-side or single-side printing, (e) A shorter side binding or longer side binding in the case of double-side printing (in the case of single-side printing, zero, which shows invalid, is entered), (f) The number of pages printed per sheet N in 1 in the case of down-scaled printing, (g) A "group/sort" for plural output copies, (h) A "saddle edge" showing whether or not two pages are printed on one sheet by automatically exchanging page sequence in output of plural pages to be bound in the spine as in magazine, (i) A "staple" showing a stapling, (j) A "punch" showing the sheets are punched, and (k) A "shift" showing whether or not the output sheets are divided into right and left in each output unit when dividing the sort outputs when the finisher is full.

In the network print system having such configuration, an operation by the output instruction from the operation controller 122, a client, and an operation by a re-output manipulation from the operation unit 136 will be explained by referring to FIG. 27 through FIG. 31.

A user instructs an output of data such as application data to the printer 123 from the operation controller 122, and transfers the file (step S160). As a result, the output files are sent to the printer 123 through the server (not shown). In the printer 123, the DL page counter is firstly reset to zero, the files are converted sequentially into display list (DL) files by an interpretation controller 129, and a DL file corresponding to the number on the DL page counter is expanded in a DL memory 130 (step S161). After expanding it for one page, the printer 123 inquires whether the N-Memory server 125 is valid or not (step S162). Upon receiving this inquiry, the server 125 judges valid and returns acknowledgement (ACK) (step S163). If the ACK is not returned within a specific time due to the stop of the server 125 or a trouble on the LAN 121, the printer 123 judges the server 125 is invalid (step S164). If it is invalid, the printer 83 adds information of the output file to a non-registration list (step S165), and instructs an ordinary data output to the engine 127 (step S166). At step S164, if the server 125 is valid, the printer 123 calculates the size of the each of all DL files (step S167), and compiles a file header 144 as shown in FIG. 26 (step S168). Then the printer 123 sums up the output condition, and compiles an output condition header 146 as shown in FIG. 26 (step S169), and transfers the headers 144 and 146 to the N-Memory server 125 (step S170). In the N-Memory server 125, the received file header 144 and output condition header 146 are stored in the HDD 137 (step S171), and an OK ACK is returned to the printer 123 (step S172 in FIG. 28). After confirming the ACK, the printer 123 transfers the DL file of the first page to the server 125 (step S173). The server 125, receiving the DL file, stores the file corresponding to the file ID in the HDD (step S174), and returns an OK ACK to the printer 123 (step S175). After confirming the ACK, the printer 123 instructs the server to send the expanded DL file of the first page to the engine (step S176), and counts up the DL page counter by one (step S177). Then, the printer 123 checks whether the DL file is the final page or not (step S178). If it is not the final page, back to step S173, the second and successive pages are processed similarly.

If it is the final page, the printer 123 sends an end notice to the server 125 (step S179). As a result, the server 125 confirms that all DL files corresponding to the file ID are normally received, and closes the file (step S180), and returns an OK ACK to the printer 123 (step S181). The printer 123 recognizes the ACK, and terminates the operation (step S182).

The processing of re-outputting an image by the N-Memory server 125 will be explained by referring to FIG. 29 to FIG. 31.

The user selects the re-output function by the operation unit 136 of the printer 123 (step S190). The printer 123 inquires the server 125 whether it is valid or not (step S191). Receiving the inquiry, the server 125 judges valid and returns an ACK (step S192). If the ACK is not returned within a specific time due to the stop of the server 125 or a trouble on the LAN 121, the printer 123 judges that the server 125 is invalid (step S193). If it is invalid, the display unit 142 of the operation unit 136 shows "No additional output Is Available" (step S194). If the server 125 is valid, the printer 123 requests, to the server 125, a list of files to be able to be re-output (step S195). The server 125 selects and sends an output list to printer 123 of the MAC address (step S196). The printer 123 combines the received output list and the output disable lists compiled at step S165, and shows them on the display unit 142 of the operation unit 136 (step S197). FIG. 25 shows an image on the display unit 142 at this time. In the diagram, the output disable file is indicated by gray.

With operating the up or down arrow key shown in FIG. 25, a user selects a desired file to be re-output (step S 198), while he/she cannot select the output disable file at this time.

The printer 123 transmits an output condition request of the file ID selected by the user to the server 125 (step S199 in FIG. 30). The server 125 transmits the output condition of the file corresponding to the requested file ID (step S200). The printer 123 displays the received output condition on the display unit 142 of the operation unit 136 (step S201). The user, with operating up, down, right and left arrow keys shown in FIG. 25, sets the re-output condition of the file. The printer 123 is set to this setting condition as the output condition (step S202).

By setting itself busy on the network (step S203), the printer 123 does not accept output requests from the server (not shown) or other operation control device 122 and makes them wait to requested.

The printer 123 resets the output counter 135 to zero (step S204), and transmits, to the N-Memory server 125, the file ID to be output (step S205). The server 125 transmits the first page of the DL file corresponding to the file ID (step S206). The printer 123 stores the DL file of the received first page in the DL memory 130 (step S207). The printer 123 expands it for one page, and starts the engine according to the output condition set by the user (step S208).

The printer 123 monitors a number on the output counter 135, increment it up, and compares it with a number on the DL page counter (step S209). When the number on the output counter is smaller, back to step S206, the DL file of the second page is sequentially stored in the DL memory. When the final page is output at step S206, and when a number on the DL page counter is equal to that on the output counter, the printer 123 sends a normal output notice to the server 125 (step S210). As a result, the server 125 processes to terminate the DL file output (step S211), and returns an OK ACK to the printer 123 (step S212). The printer 123 cancels its busy state on the LAN 121 (step S213), and terminates the operation (step S214).

According to embodiment 4, the printer 123 stores the output condition of the printer along with the DL file in the N-memory server 125 during outputting it, reads the stored file and output condition again, and outputs the file additionally according to the output condition. Therefore, the printer 123 can print out the file in the same output condition as before easily when additionally outputting it.

According to embodiment 4, the finisher 124 is connected, however, even if the finisher 124 is not connected, the system works I the same manner with the output counter 137 of the engine 127 utilized instead of the counter of the finisher 124.

If the printer 123 has a double-side printing unit, the double-side condition can be set as the output condition, so that the printer 123 may perform the double-side output during the re-output.

In embodiment 4, after expanded for one page through the page memory, the data is printed out. But same as in embodiment 2, when the printer has a band memory, the data from the N-Memory server 125 can be printed out. In this case, the printer does not require the page memory, and can be more inexpensive.

The input unit for receiving print data from the communication network and the memory data input/output unit for exchanging data in the printer intermediate language with the memory server through the communication network may be common.

In embodiment 4, further, the N-Memory server 125, a memory medium, may be often realized by the computer such as a PC, but also realized by a general-purpose computer, work station, or another printer incorporating a memory and an HDD.

The invention may be changed and modified in various modes without departing from the true spirit of the invention.

What is claimed is:

1. A network print system having a communication network comprising:
   a memory server coupled to said communication network; and
   a printer comprising:
      an input unit for receiving print data from said communication network;
      an interpretation controller for converging the print data into a file in a printer intermediate language;
      an expansion controller for expanding the file into bit map data;
      a memory for storing the bit map data;
      a memory data input/output unit for exchanging the file in the printer intermediate language with said memory server through said communication network; and
      an engine for printing the bit map data;
   wherein said printer prints the bitmap data of the file and sends the file to said memory server,
   wherein said memory server stores the file, and
   wherein said printer is operable to
      read the file stored by said memory server from said memory server;
      expand the read data into bit map data; and
      print the bitmap data of the read file.

2. The network print system of claim 1,
   wherein said printer further comprises an error detector for detecting a printing error of the print data,
   wherein said memory is a page memory, and
   wherein said printer, when the printing error is detected, reads a file on a page which is not printed out in the file from said memory server and prints the data.

3. The network print system of claim 1,
   wherein said printer further comprises an error detector for detecting a printing error of said print data,
   wherein said memory is a band memory, and
   wherein said printer, when the printing error is detected, reads a file of a beginning band of a page which is not printed in the file from said memory server, while arbitrating a flow with said memory server.

4. The network print system of claim 3,
   wherein said printer sends a flow control stop signal to said memory server when said band memory is full, and
   wherein said printer reads a file of the beginning band of the page not printed of the file from said memory server when detecting the printing error and when not sending the flow control stop signal.

5. The network print system of claim 1,
   wherein said printer further comprises an operation unit for selecting a first file of the file in the print intermediate language by displaying a printing status of the file in the print intermediate language, and
   wherein said printer reads the first file from said memory server.

6. The network print system of claim 5, wherein said printer is set busy on said communication network while printing the first file.

7. The network print system of claim 5,
   wherein said printer sends the file in the printer intermediate language and file identification information of the file to said memory server parallel to print the file,
   wherein said memory server stores the file and the file identification information,
   wherein said printer reads first file identification information of the first file of the file identification information from said memory server, and
   wherein said operation unit displays the first file information.

8. The network print system of claim 5, wherein said printer inquires said memory server whether said memory server is valid or not at least one of before printing the file and before reading the file from said memory server.

9. The network print system of claim 5,
   wherein said printer sends the file and printer setting information of the file to said memory server and prints the bit map data,
   wherein said memory server stores the file and the printer setting information, and
   wherein said printer reads printer setting information of the first file of the printer setting information from said memory server.

* * * * *